US006993473B2

(12) United States Patent
Cartus

(10) Patent No.: US 6,993,473 B2
(45) Date of Patent: Jan. 31, 2006

(54) PRODUCTIVITY TOOL FOR LANGUAGE TRANSLATORS

(75) Inventor: John R. Cartus, Sewickley, PA (US)

(73) Assignee: Equality Translation Services, Sewickley, PA (US)

( * ) Notice: Subject to any disclaimer, the term of this patent is extended or adjusted under 35 U.S.C. 154(b) by 782 days.

(21) Appl. No.: 09/944,766

(22) Filed: Aug. 31, 2001

(65) Prior Publication Data

US 2003/0046062 A1    Mar. 6, 2003

(51) Int. Cl.
 *G06F 17/28* (2006.01)
(52) U.S. Cl. ............................................. 704/2; 704/5
(58) Field of Classification Search .................. 704/2, 704/277
 See application file for complete search history.

(56) References Cited

U.S. PATENT DOCUMENTS

| | | | |
|---|---|---|---|
| 4,623,985 A | 11/1986 | Morimoto et al. | |
| 5,010,486 A | 4/1991 | Suzuki et al. | |
| 5,303,151 A * | 4/1994 | Neumann | 704/2 |
| 5,612,872 A | 3/1997 | Fujita | |
| 5,930,746 A | 7/1999 | Ting | |
| 5,956,668 A | 9/1999 | Alshawi et al. | |
| 5,974,370 A | 10/1999 | Suda et al. | |
| 5,978,754 A * | 11/1999 | Kumano | 704/3 |
| 6,857,022 B1 * | 2/2005 | Scanlan | 709/229 |
| 2001/0047255 A1 * | 11/2001 | Fuji | 704/10 |
| 2003/0004702 A1 * | 1/2003 | Higinbotham | 704/2 |
| 2003/0040899 A1 * | 2/2003 | Ogilvie | 704/2 |
| 2003/0040900 A1 * | 2/2003 | D'Agostini | 704/2 |

OTHER PUBLICATIONS

"Where Do I Start," printed from http://www.languagepartners.com/reference-center/start-here/index.htm on Nov. 2, 2000.
"An Introduction to Computer Aided Translation (CAT)," printed from http://www.languagepartners.com/reference-center/whitepapers/catinto.htm on Nov. 2, 2000.
"How to Select the Right CAT Tool Solution," printed from http://www.languagepartners.com/reference-center/whitepapers/genwp/howto.htm on Nov. 2, 2000.
"Systran® Translation Software," printed from http://www.translation.net/systrans.html on Nov. 2, 2000.
"Power Translator Pro," printed from http://www.translation.net/ptpro.html on Nov. 2, 2000.
"Systran Enterprise," printed from http://www.systransoft.com/Enterprise.html on Oct. 31, 2000.
"Systranet.com," printed from http://www.systranet.com/systran/net on Oct. 31, 2000.

* cited by examiner

*Primary Examiner*—Susan McFadden
*Assistant Examiner*—Matthew J. Sked
(74) *Attorney, Agent, or Firm*—Kirkpatrick & Lockhart Nicholson Graham LLP

(57) ABSTRACT

A computer-assisted method of assisting a language translator. The method includes highlighting an area of source text to be translated into a target language and allowing insertion of text in the target language following the highlighted area of source text. The method also includes removing the highlighted area of source text after insertion of text in the target language.

19 Claims, 33 Drawing Sheets

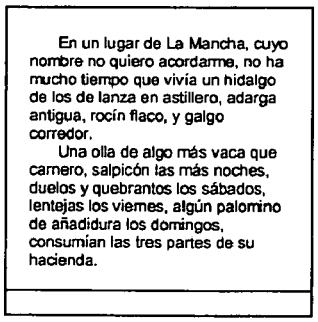 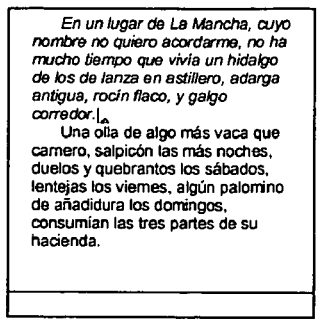 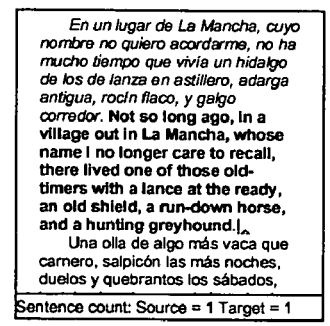
FIG. 3A  FIG. 3B  FIG. 3C
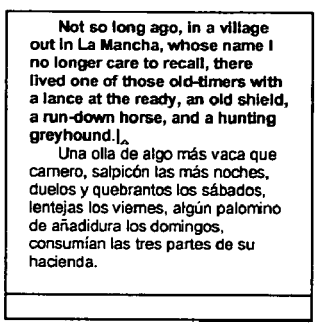 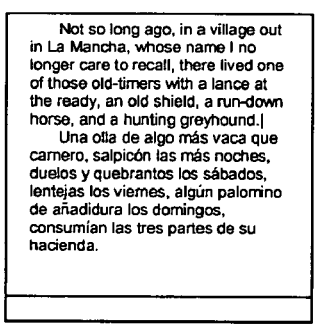 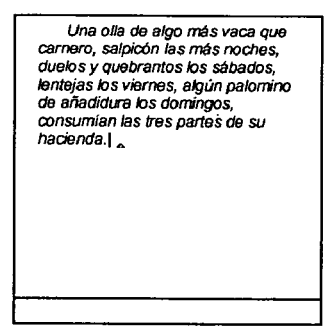
FIG. 3D  FIG. 3E  FIG. 3F
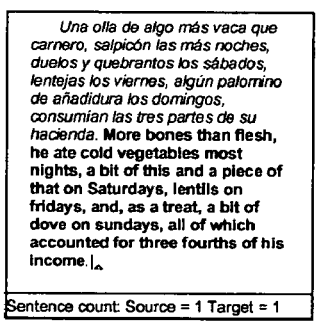 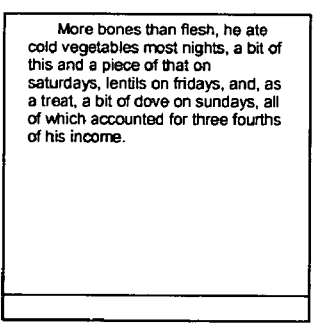
FIG. 3G  FIG. 3H

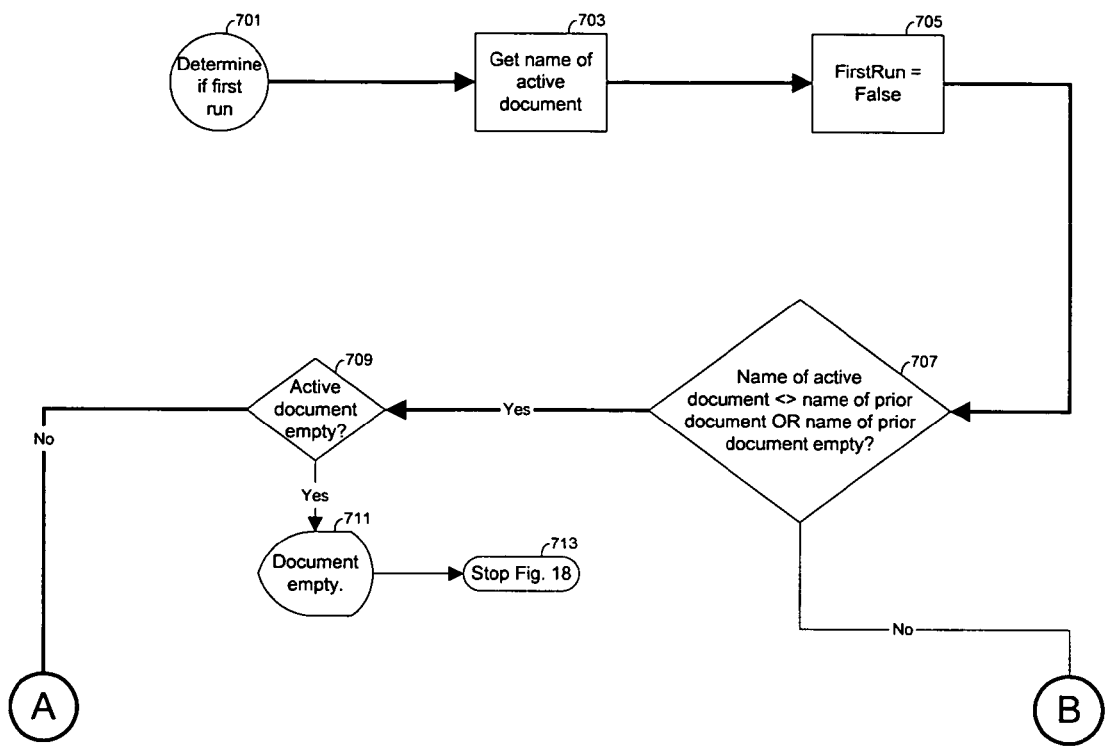

PRODUCTIVITY TOOL FOR LANGUAGE TRANSLATORS

BACKGROUND OF THE INVENTION

1. Field of the Invention

The present invention relates to a system and process for improving the productivity and efficiency of human translators of natural languages.

2. Statement of the Problem

Human translators of literary and technical texts increasingly are presented with source-language documents in electronic form for translation into a target language.

The principal ways for human translators to process such texts at present include printing any such text and then translating the text from the paper copy using a word processor on a computer or using cut-and-paste methods to insert the translation in place of the source-language text on the display device of the computer, such newly translated text to be saved to disk and subsequently printed or otherwise processed, or using machine-assisted translation programs referred to as translation memories.

Producing the target-language version when the source-language version is printed is time consuming since the translator must divide his or her attention between the paper and the screen, perform possibly extensive reformatting, scroll back and forth in the document on the screen to move forward, edit previous mistakes, etc., shuffle the various pages of the printed copy as text is processed, and repeatedly determine where on the page the next segment of text to be translated is, with consequent possible skipping of text.

Using translation memories to aid in the production of the target-language version requires the purchase of additional software, learning of new work habits, and often results in very slow response because of the complexity of the translation memory files.

However, the process of translation by human translators, when working in a subject area with which they are familiar, essentially becomes a word-processing task, since the amount of research and lookup is limited. Translation of highly technical material is done by human translators for documents like patents, research papers, technical specifications, contracts, bid documents, legislation, and the like, where the experience and education of the translator are unmatched.

Furthermore, translator's with access to always-on, high-speed Internet connections now have the ability, using one or more very fast search tools, to use the Internet as a knowledge-base or free-form on-line content, essentially comprising all sites in the source language in question, and sites in both the source and target languages in question, such as on-line glossaries, whereby an unknown word or phrase can be looked up on the Internet more quickly than it can be looked up in a printed dictionary, thus placing even greater emphasis on the translator's ability to process words and deal with the other clerical tasks involved.

Moreover, the fairly recent innovation of the inclusion of a high-level programming language that operates within the context of a word processor and operates on the files created by such word processor has made the present invention possible. The present invention allows human translators to focus solely and exclusively on the translation of the text, without having to move papers, keep track of place, run other programs, perform formatting, or remember operating instructions. It is not necessary to add another program to do this, since the process operates within the context of the word processor itself, although other embodiments are possible.

Experienced human translators develop pattern-matching abilities that are used extensively in the translation process. Moreover, most state-of-the-art word processors in which the various documents that move across international borders would be composed include a shorthand feature that translators use as a built-in, high-speed translation memory, whereby the translator mentally associates the text on the screen or page in the source language with its corresponding translation, and then makes the further association from the translation to an abbreviated, shorthand version of the corresponding target text that has been previously stored and which abbreviated version can be retrieved using a keyboard shortcut or other command. Words, phrases, sentences, and paragraphs can be recalled and inserted into the text almost instantly.

The present invention leaves the translator free to translate and takes over the task of presenting units of source text for translation, allowing insertion of the corresponding translation, and moving through the document.

The problem solved by the present invention is the problem presented in having to move papers, mark place, select text, remove text, possibly reformat text, and scroll back and forth in a document. The present invention obviates the need to work from paper when the source-language text is available in electronic form, it performs the functions of selection and removal of text, it overcomes the need to possibly reformat text, it automatically scrolls through a document, and, using comparison of source- and target-language texts, it helps to prevent the translator from skipping text during the translation process, and it reduces the physically stressful use of a mouse to a minimum. The process uses little or no overhead in computing resources.

Translation prior art primarily focuses on machine translation or machine-assisted translation. Machine translation has the drawback that it is often very difficult to prove, using automated means and methods exclusively, when the source-language text has not been produced according to the rules of a constrained grammar, that the translation into a target language of such source-language text is correct, which proof could require the skills of one or more human translators. Translation memories require additional expenditures and often produce files of such size as to cause system delays.

A prior art approach is to utilize machine-translation processes that attempt, using statistical processes, databases of examples, knowledge bases, tree structures, and other processes, to directly translate text in a source language into a target language, regardless of the complexity of the source text. Systems such as this are of limited usefulness to an experienced translator. For an experienced translator, using a machine-translation system shifts the focus of the translator's work from translating to proofreading, i.e. making sure that the translation produced by the system captures the thought, intent, symbolism, etc., embodied in the source text.

Other prior art approaches utilize interactive machine-translation approaches that attempt, using statistical processes, databases of examples, knowledge bases, tree structures, and other processes, to directly translate text in a source language into a target language, regardless of the complexity of the source text, and that allow a user to edit the translations produced by the machine. Systems using this approach are of limited use to experienced translators since they require the purchase of additional software, the learning of sometimes complex procedures, and delays while the system attempts to process sentences or text that an experienced translator would handle without hesitation.

Certain prior art systems utilize network-based machine-translation approaches that provide user-to-user translations of a plurality of source languages into a plurality of target languages for users of a network. Since these approaches are used to connect one user of a network directly to another user of a network when the users write or speak in different languages, through a translation process available to the users, human translators are bypassed completely, thus these approaches are of very limited usefulness to an experienced human translator in a production environment.

Still other prior art approaches utilize machine-translation arrangements that attempt to handle specific cases that are difficult for more broadly focused machine-translation systems to deal with, such as formatting information that the system finds confusing, unrecognized words such as proper nouns, or polysemous words. Systems such as these are helpful to an experienced human translator insofar as the translator uses a machine-translation system, as discussed previously.

Machine-translation approaches are also known in the art and can be used for speech and can use the machine-translation methods to provide speaker-to-speaker translations using various combinations of voice recognition, machine-translation, speech synthesis, and addressing methods for routing the spoken signals and the corresponding translations thereof to and from the various users of a speech communications systems. Systems such as these are of limited usefulness to human translators in a production environment.

Specialized machine-translation devices that use machine-translation or translation-memory approaches in the context of a device, such as a handheld device or hearing aid, exist in the art. Given the very limited vocabulary of these devices and the fact that they are in many cases intended for use by people without knowledge of a given target language, they are of little use to an experienced human translator.

Interlingua approaches, which attempt to provide a complete translation from source to target using computing means and processes with limited user interaction, relying on preparation of the source text before translation to constrain it to a subset of source-language constructs and then representation of the source text in a symbolic, intermediate language that can then be more easily translated by machine into a plurality of target languages also exist in the art. Since these approaches essentially seek to be a replacement for the human translator and require prohibitively expensive hardware and software, they are of little or no use to the individual translator.

Translation-memory approaches that use memory to store frequently used words and phrases and that can be recalled by the user for insertion into documents being translated are known in the art. Such approaches are useful to human translators in a production environment but require additional software and learning.

Schemes exist in the prior art that are translation memory approaches that use memory to store source text and its translation to be recalled in specific cases like signage, announcements in public places, localization of computer software, and administration of distributed networks. These approaches are not useful to human translators working in a production environment.

Translation-memory approaches applied to speech that use source text and associated translations stored in memory for decomposing and translating speech input and then synthesizing speech output in a target language are also known in the art. These approaches are not useful to human translators working in a production environment.

Translation-memory devices that are used to display the translation into a target language of words and phrases in a source language stored in a memory are known in the art. These devices are generally too narrow in coverage to be useful to professional translators working in a production environment.

The present invention overcomes the shortcomings of the prior art. The present invention takes an approach different from the approach taken in the prior art, in that the present invention considers a word-processing document file as being little different from a loosely structured database file, by considering each paragraph in the document as a record, and then processing the file record by record (paragraph by paragraph), whereby the invention performs the tasks of retrieving records and presenting each record for processing until all records have been processed. The present invention eliminates the need to handle pages of source-language text during the translation process, helps the translator to avoid skipping text by comparing source- and target-language texts, and moves paragraph by paragraph through the document. The present invention removes the burden of having to mark place in a document, performs at a much greater speed than any human translator could perform the same processes, and reduces the use of the mouse or keyboard to navigate through a document and the attendant physical stress to the user.

BRIEF SUMMARY OF THE INVENTION

The present invention is directed to a computer-assisted method of assisting a language translator. The method includes highlighting an area of source text to be translated into a target language and allowing insertion of text in the target language following the highlighted area of source text. The method also includes removing the highlighted area of source text after insertion of text in the target language.

One way to express hourly productivity of human translators who work with word-processing software and who read text in one language and enter text in another language is by the formula:

$p=(wpm \times 60)$, where "$p$" is productivity or output and "$wpm$" stands for "words per minute".

Simply stated a translator in this situation can output in one hour at most only as many words as he or she can type. Thus, a translator who can type 70 words per minute could produce 4,200 words of translated text at most in one hour.

However, in a production environment there are many factors that drastically reduce the productivity of a translator, among them lookup of unknown terms, moving of paper, searching for the next unit of text to process, formatting the text if necessary, and dealing with the word-processing program itself.

Thus it becomes necessary to add a scaling-factor to the above formula to more accurately estimate the output of the translator. The formula can then be better expressed as:

$p=sf \times (wpm \times 60)$, where "$p$" is productivity, "$wpm$" stands for "words per minute", and "$sf$" is a scaling factor whose value is usually between 0 and 1.

In practice it can be estimated that the value of "$sf$" would be 0.25 or lower. Thus, if "$sf$"=0.25, a translator who can type 70 words per minute would probably produce about 1,000 words of translated text per hour at most since most of the translator's time is spent on non-translation tasks.

The present invention has the advantage that it increases the value of "sf" in the above equation by removing non-translation tasks from the work of the translator. It is also an advantage of the present invention that it can raise the value of "sf" to 0.5 or even 0.75, meaning that a translator could translate over 2,000 words in an hour.

If voice-recognition software is introduced on top of the word-processing software, and assuming a recognition rate of 120 words-per-minute for an experienced user, the output of an experienced user might then approach 4,000 words per hour so that, further assuming that a form of compare-and-cross-out proofreading can be done at the rate of 1,500 words per hour, in an eight-hour workday a translator's output could approach 8,500 words of proofread translation, with much less strain.

Further advantages of the present invention include:
(a) provides a method for automatic identification and color highlighting of the first or next unit of source-language text;
(b) provides a method for movement of the source language text to the top of the output video device;
(c) provides a method for automatic positioning of the cursor immediately following the source-language text;
(d) provides a method to allow for insertion of the translation corresponding to a unit of source-language text immediately following the source-language text;
(e) provides a method for preserving the formatting of the source-language text;
(f) provides a method for the changing of the color of the target text being inserted, if the color of the corresponding source text has been changed;
(g) provides a method for changing the color of the target text to match the color of the source-language text, after deletion of the source-language text;
(h) provides a method for reporting to the user when statistical anomalies are detected between the source-language text and the target-language text;
(i) provides a method for automatic deletion of the source-language text once the user has completed insertion of the corresponding target language; and
(j) provides a method for methodical progress through a document, by repeating steps (a) through (i) until the end of the document has been reached or until termination by the user.

Further advantages of the invention are to provide a method for moving through a document using a word processor and inserting target-language translation immediately after source-language text, allowing the inserted target text to assume the formatting of the source text, identifying the next unit of source-language text, preparing for insertion of translation, and so on to the end of a document, in which the processes described are performed at machine speed while only the actual translation is performed at human speed. Still further advantages of the present invention will become apparent from a consideration of the ensuing description and drawings.

BRIEF DESCRIPTION OF THE DRAWINGS

FIGS. 3A–3H illustrate depictions of an example of a result of the process of FIGS. 1 and 2 as might be viewed on an output device of a computer during processing of two paragraphs of source-language text;

FIGS. 7A–7B illustrate a flowchart showing the steps in an embodiment of the subprocess used to determine if the current execution of the process is the first in a document;

DETAILED DESCRIPTION OF THE INVENTION

Figure 1A:
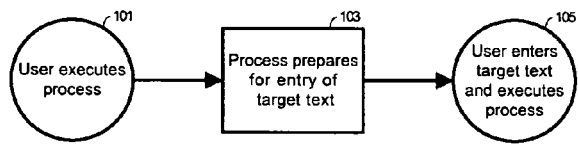
FIGS. 1A–1C illustrate flowcharts showing an embodiment of a process of the present invention.
Figure 1B:
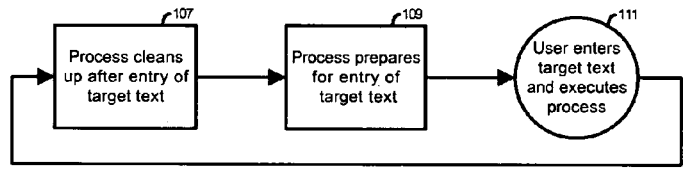
Figure 1C:

FIGS. 1A–1C illustrate flowcharts showing an embodiment of a process of the present invention. FIG. 1A shows the functions performed by the process in the first execution in a document, and includes first execution of the process by the user (101), preparation for entry of text (103), and entry of target text by the user and execution of the process again (105). FIG. 1B shows certain functions performed during all intermediate executions of the process, namely cleaning up after the prior entry of target text (107), preparation for entry of target text (109), and entry of target text by the user and execution of the process (111). FIG. 1C shows the functions performed during the last execution of the process, either because the user has requested that the process end or because the process has detected the end of the document. In this case the process cleans up from the prior entry of target text (113) and stops (115).

Figure 2:
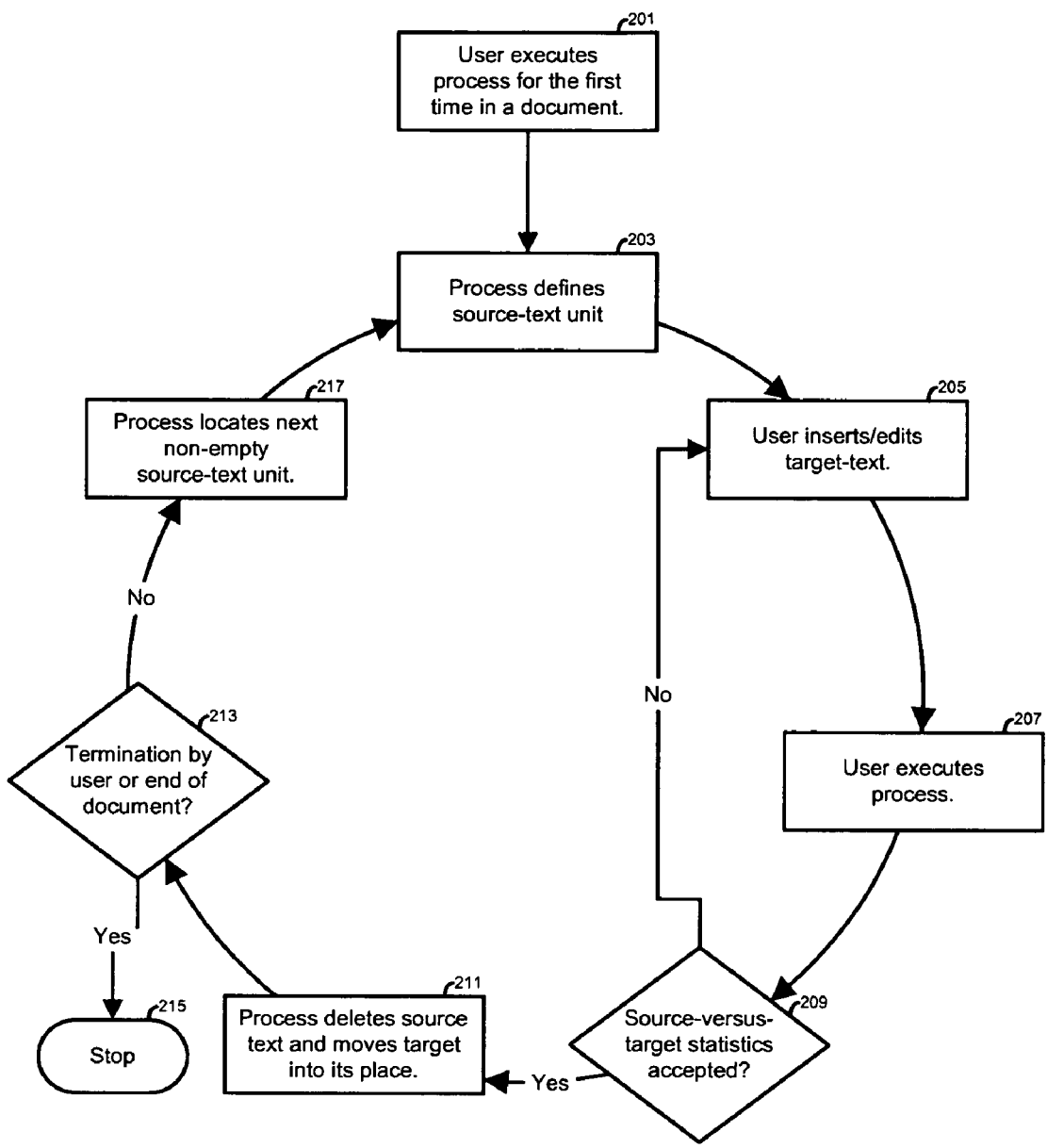
FIG. 2 is a depiction of the process shown in FIG. 1 illustrating the circular, repetitive nature of the process.

FIG. 2 is a depiction of the process of FIG. 1 illustrating the circular, repetitive nature of the process. The process starts with the user's opening a file containing text for translation or positioning the cursor at the starting point in an already-opened file and then executing the process (201). The process defines a contiguous source-language unit (203). The user inserts the corresponding target-language text (205) and executes the process again (207). The process computes comparative statistics for the source- and target-text units and alerts the user to anomalies, if any, (209), allowing the user to continue or move back to step (205) to edit the target-text unit. The process removes the source-language unit previously defined (211), and the just-inserted target-language text automatically takes its place. The process checks: 1) if the user has indicated a desire to stop processing or 2) if the end of the document has been reached (213), stopping (215) if either condition is true. Otherwise the process moves past the inserted target language, searches for the next non-empty source-language unit (217), and defines this as the next source-language unit for translation (203), at which point the process repeats until the user stops the process or until the end of the document is reached (213 and 215). The process is repetitive in nature in that the same steps are performed in the same order over and over to produce the desired result.

FIGS. 3A–3H graphically display one first execution and one intermediate execution of the process, with the intermediate execution also being a final execution, by illustrating examples of how the computer display screen appears to a user in practice. FIG. 3A depicts two paragraphs of an example source-text document on a representation of a display screen. The color of the text in both paragraphs is uniform (e.g. black). FIG. 3B shows how the display would appear after the user executes the process for the first time. The process defines the first paragraph as the source-text unit and changes the highlighting of this text to italic text, since the text in the original paragraph was uniform (i.e. no italic or bold). The process inserts a separator unit (indicated by the character "|" for clarity) at the end of the source-text unit, and leaves the cursor, which is shown as a vertical bar, indicating the insertion point or where input will next be placed by the system, between the end of the source-text unit and the separator unit. The process stops at this point since there is no housekeeping to be done from a previous execution. FIG. 3C shows what the screen looks like after the user has entered the target-text translation of the source text highlighted in italics in FIG. 3B and FIG. 3C. In FIG. 3C the just-entered target-text unit is highlighted in bold since the source-text unit had been highlighted in italics. This is done so that the user knows where to focus on the display. The user executes the process again. Since there is a both a source-text unit and a target-text unit defined, the process then computes comparative statistics for the two units, An example of this is shown at the bottom of FIG. 3C, where the process displays the message that the source unit and target unit both contain one sentence. If the number of sentences were not equal, or if other statistical anomalies were found, an error message would be displayed preventing the user from continuing until the anomalous statistics are accepted or the user indicates that he or she wishes to edit the target-text unit. FIG. 3D shows the screen after the process continues execution of its function, that is, to remove the highlighted (italic), source-text unit shown in FIG. 3B and FIG. 3C. The process continues from FIG. 3D to FIG. 3E and FIG. 3F. In FIG. 3E the process has changed the highlighting of the just-entered target text from bold to no highlighting, has removed the separator unit (displayed as the character "|" in FIG. 3D), it searches forward for the next non-empty paragraph and, in FIG. 3F, it finds the next source-text unit, highlights the text (italic) for emphasis, and moves the just defined source-text unit to the top of the display screen with the cursor remaining at the end of this unit and the separator unit in place immediately after the source-unit, with the cursor between the two units, ready for entry of target text. Thus, FIG. 3C, FIG. 3D, FIG. 3E, and FIG. 3F make up the second execution of the process. FIG. 3G shows the display after the user has entered the target-text translation corresponding to the highlighted (italic) source-text unit shown. The user executes the process again and, at the bottom of the screen, as in FIG. 3C, the sentence counts in source unit and target unit are shown, for information purposes and no action is required by the user, since the counts are equal. The process removes the source-text unit, removes the highlighting of the target-text unit, and removes the separator unit ("|"), as shown in FIG. 3H. The process stops at this point since the end of the example document has been reached. On a personal computer, the interval of time between: a) when the user finishes entry of target text corresponding to a source-text unit and executes the process and b) when the process has executed all its functions and returned control of the system to the user for entry of the next unit of target text, the interval represented by FIG. 3C, FIG. 3D, FIG. 3E, and FIG. 3F, is short enough to consider the task of entry of target text by the user to be an essentially continuous process.

Figure 4A:
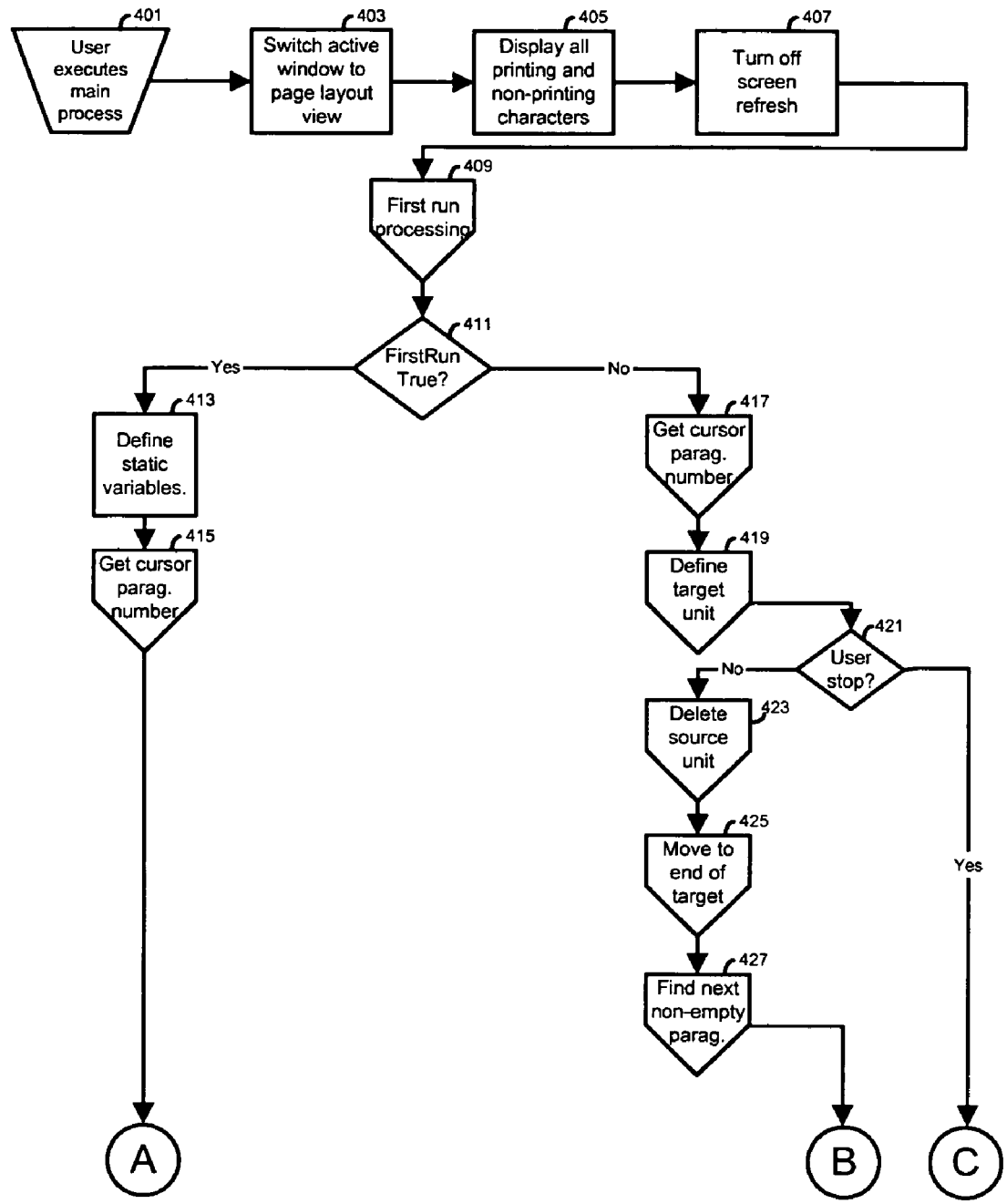
FIGS. 4A–4B illustrate a flowchart with a functional overview of an embodiment of the process of the present invention, indicating certain functions performed by each subprocess of the process.
Figure 4B:
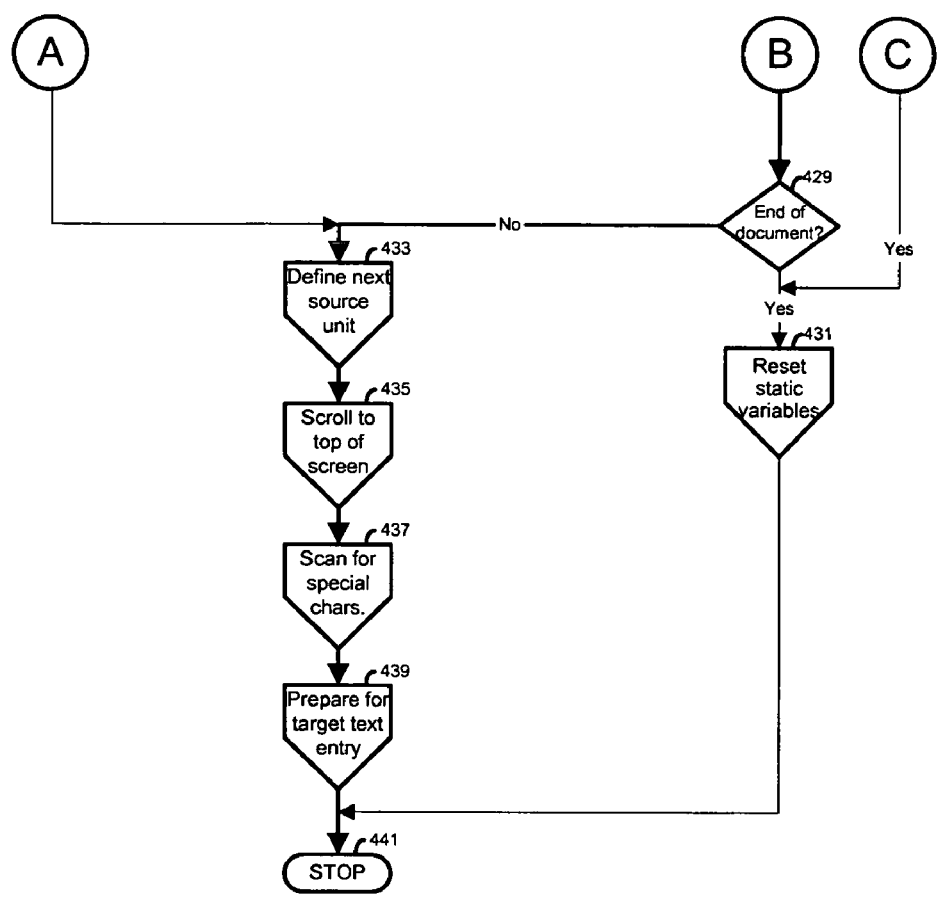

FIGS. 4A–4B illustrate certain functions performed by the various subprocesses of an embodiment of the process of the present invention, in their order of execution. The two points where the process can stop are illustrated (steps 421 and 429).

The functions performed by the process after the user invokes execution, after various setup functions are performed (401 to 407), are:

1. Perform first-run processing (409). Determine if this execution is the first in a given document (411). If it is not the first run go to step 2. If it is the first run:
   a. Define static variables (413);
   b. Get the number of the paragraph where the cursor is (415),
   c. Go to step 433.
2. Get the number of the paragraph where the cursor is (417);
3. Define the unit of target text inserted by the user (419):
   a) Check if the user has ordered stop (421). If so reset static variables (431) and go to step 441, otherwise continue.
4. Delete the unit of source text (423);
5. Move the cursor to the end of the target-text unit (425);
6. Search forward for the next non-empty paragraph (427):
   a) Check if the process has reached end-of-document (429). If so reset static variables (431) and go to step 441, otherwise continue.
7. Define the next unit of source text (433);
8. Move the source-text unit to the top of the display (435);
9. Scan the source-text unit for special characters (437);
10. Prepare for entry of target text (439);
11. Stop processing (441).

The darker line connecting various blocks in FIG. 4 indicates the path of execution that, in one embodiment, is most frequent or that occurs in the absence of error conditions. This path includes steps 403, 405, 407, 409, 411, 417, 419, 421, 423, 425, 427, 429, 433, 435, 437, 439, and 441.

Figure 5A:
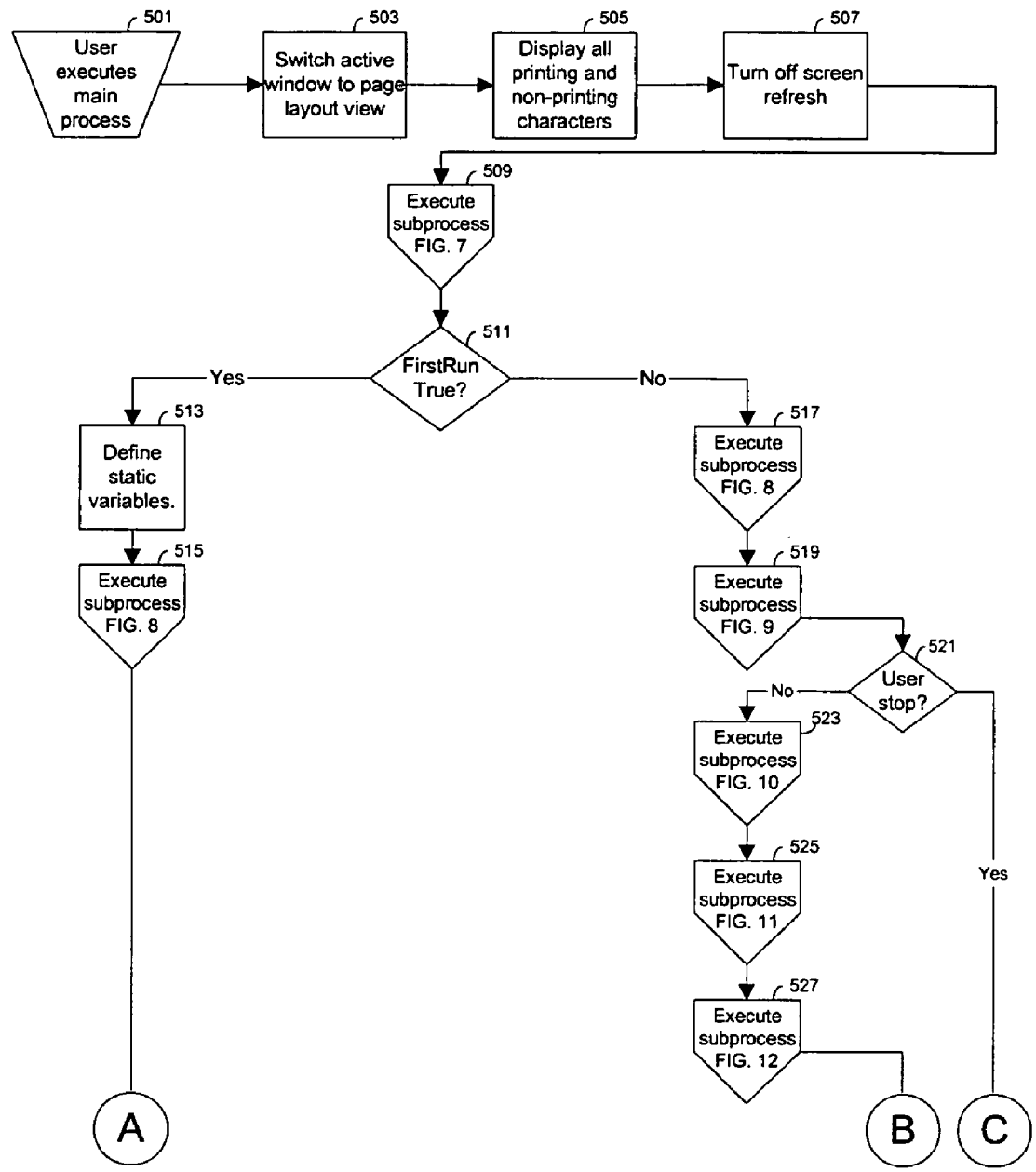
FIGS. 5A–5B illustrate a flowchart with a design overview of an embodiment of the process of the present invention indicating the subprocesses performed by the process on first and subsequent executions.
Figure 5B:
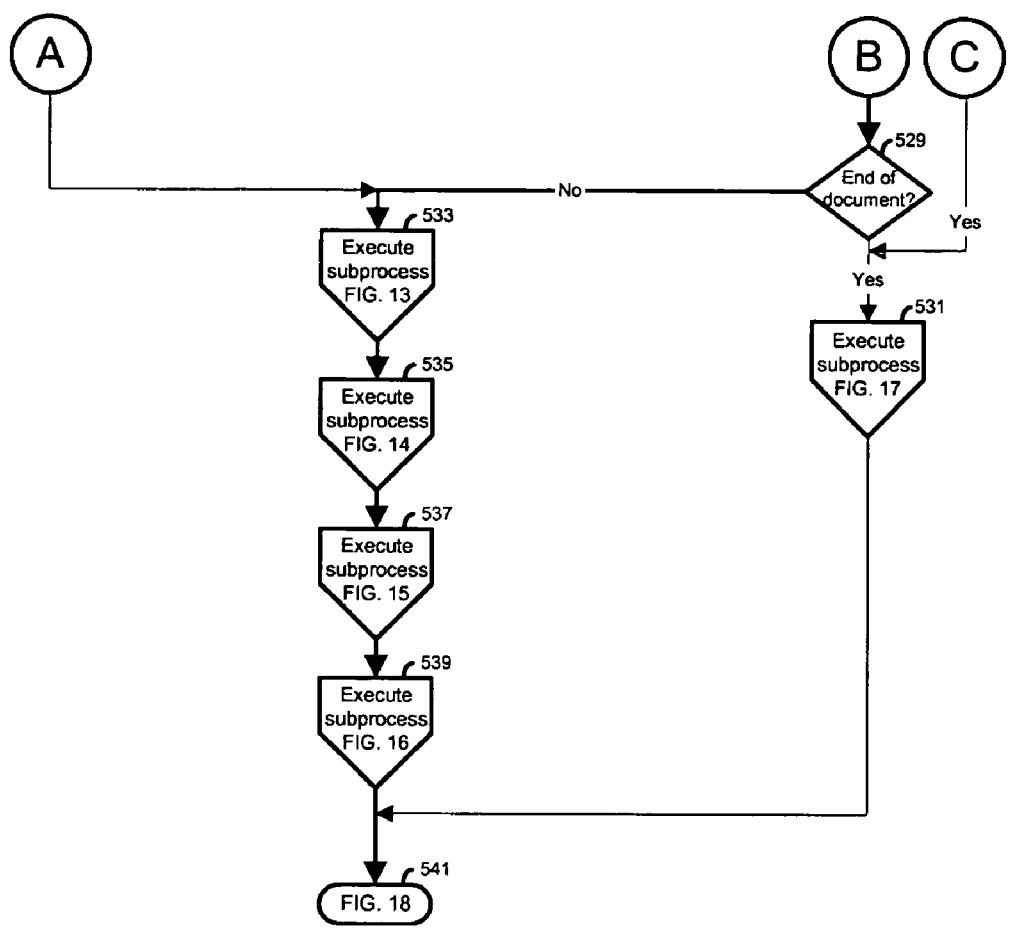
Figure 6A:
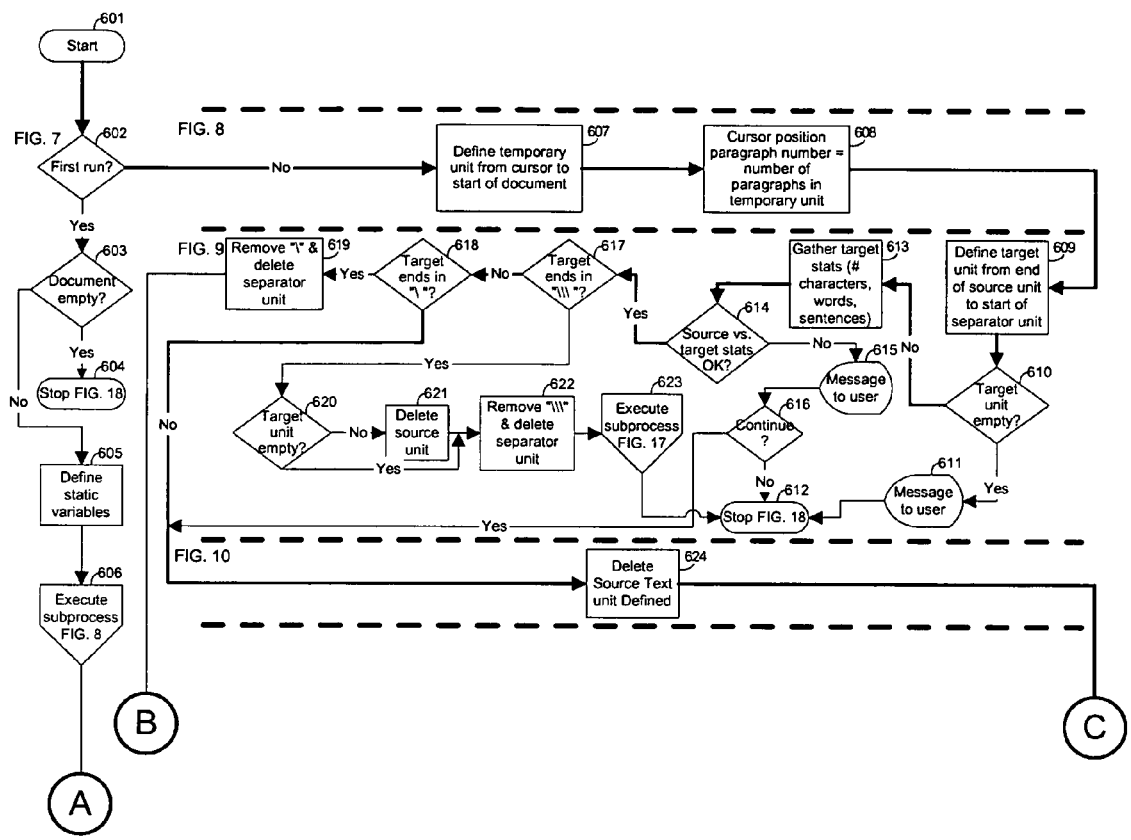
FIGS. 6A–6D illustrate a flowchart that identifies certain steps performed by ten subprocesses of FIG. 5.
Figure 6B:
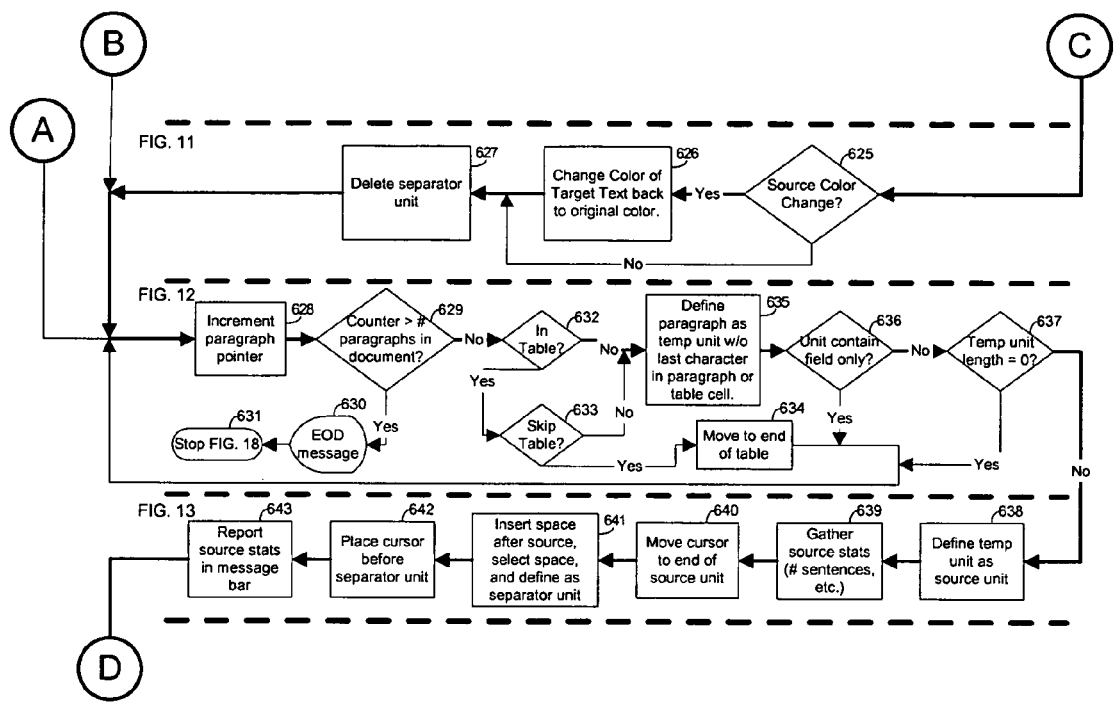
Figure 6C:
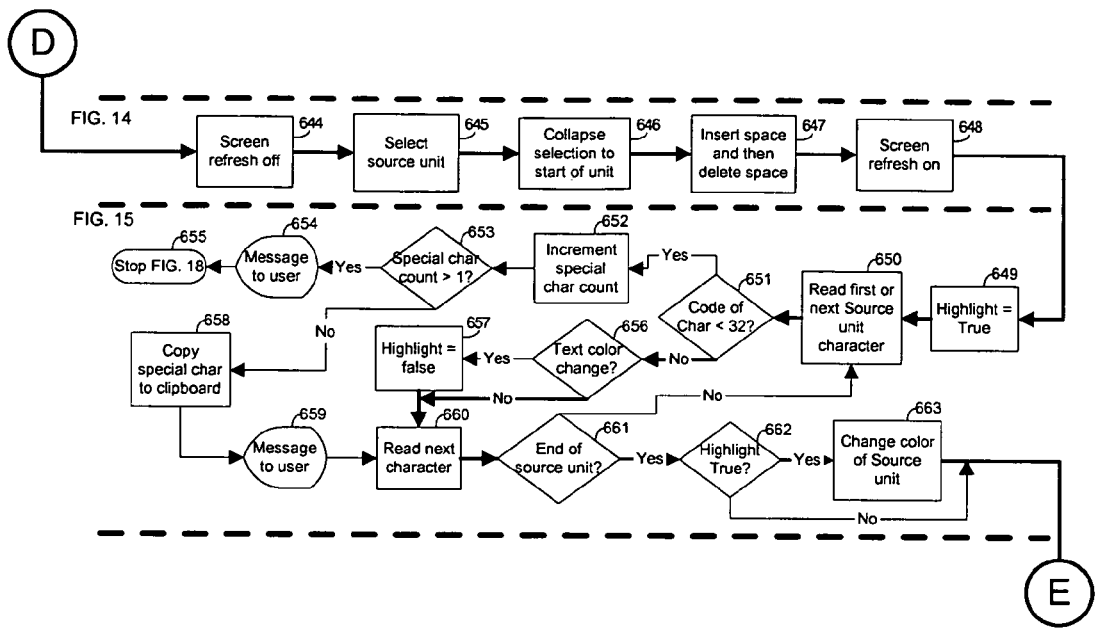
Figure 6D:
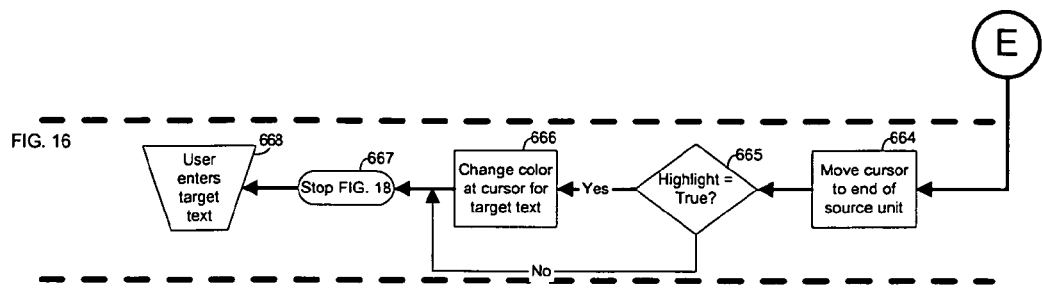

FIGS. 5A–5B illustrate a flowchart showing embodiments of the design subprocesses of the present invention. The two points where the process can stop are illustrated (steps 521 and 529).

After the user executes the process, the design subcomponents called by the process, after various setup functions are performed (501 to 507), are:
1. Execute subprocess detailed in FIG. 7 (509); if first execution (511) is true then
   a. Define static variables (513);
   b. Execute subprocess detailed in FIG. 8 (515),
   c. Go to step 533.
2. Execute subprocess detailed in FIG. 8 (517);
3. Execute subprocess detailed in FIG. 9 (519):
   a) Check if the user has ordered stop (521). If so reset static variables, the subprocess detailed in FIG. 17, (531) and go to step 541, otherwise continue.
4. Execute subprocess detailed in FIG. 10 (523);
5. Execute subprocess detailed in FIG. 11 (525);
6. Execute subprocess detailed in FIG. 12 (527):
   a) Check if process has reached end-of-document (529). If so reset static variables (531) and go to step 541, otherwise continue.
7. Execute subprocess detailed in FIG. 13 (533);
8. Execute subprocess detailed in FIG. 14 (535);
9. Execute subprocess detailed in FIG. 15 (537);
10. Execute subprocess detailed in FIG. 16 (539);
11. Stop as detailed in FIG. 18 (541).

The darker line connecting various blocks in FIG. 5 indicates the path of execution that, in one embodiment, is most frequent or that occurs in the absence of error conditions. This path includes steps 503, 505, 507, 509, 511, 517, 519, 521, 523, 525, 527, 529, 533, 535, 537, 539, and 541.

FIGS. 6A–6D show a functional overview of an embodiment of the process of the present invention. A heavy dashed line separates the subprocesses that are illustrated in FIG. 7 through FIG. 18 from each other and the figure reference number is given below each dashed line. The subprocesses of FIG. 17 (re-initialize variables) and FIG. 18 (stop) are not shown on FIG. 5, but are called by other subprocesses when the process reaches a stop condition.

The process first checks if the current execution is the first execution in a given document (602).

If it is the first execution the process checks if the current document is empty (603) and if so the process stops (604).

If it is the first execution and the document is not empty it defines the static variables needed (605), defines a temporary unit of text from the cursor to the beginning of the document (607), calculates the number of the paragraph where the cursor is (608), and performs the following functions described in detail further below. It scans forward in the document from the end of the target text to find the next non-empty paragraph (626 to 637 and FIG. 12), defines the next source-text unit (638 to 643 and FIG. 13), moves the source-text unit to the top of the screen (644 to 648 and FIG. 14), scans the source-text unit for special characters (649 to 663 and FIG. 15), prepares for entry of target text (664 to 666 and FIG. 16), the process stops (667 and FIG. 18), and the user enters the target text corresponding to the source-text unit defined (668).

If it is not the first execution, i.e. the user has entered target text corresponding to a unit of source text, a subprocess (FIG. 8) defines a temporary unit of text from the cursor to the beginning of the document (607) and then calculates the sequential number of the paragraph where the cursor is (608).

A subprocess (FIG. 9) defines the unit of target text. In step 609 a target unit is defined. The process tests if this unit is empty (610) and stops if this is the case (611 and 612). The process gathers statistics (613). The process reports anomalies (614) and if there are anomalies, the user has two options. The user may stop and edit the target (615, 616, and 612) or continue. Continuing, the process checks for special instructions by the user at the end of the target unit and processes any such instructions accordingly (617 to 623 and 612).

A subprocess (FIG. 10) deletes the source-text unit (624).

A subprocess (FIG. 11) checks if it is necessary to change the color of the target-text unit (625) and processes accordingly (626) and then deletes the separator unit at the end of the target-text unit (627).

A subprocess (FIG. 12) scans forward in the document from the end of the target text to find the next non-empty paragraph. The paragraph pointer is incremented and compared to the number of paragraphs in the document, from the subprocess in step 602 (FIG. 7), to check for end-of-document (628 to 631). The process checks if the cursor is in a table (632) and if so the user is given the option to skip the entire table (633). If the cursor is not in a table the process defines the entire paragraph except the last character as a temporary possible source-text unit (632). The subprocess then checks the unit so defined to determine if it contains just a field or some other special character (636) or if the unit is empty (637), in either case the search resumes at step 628. Otherwise the cursor remains where it is for the next subprocess.

A subprocess (FIG. 13) defines the temporary unit as the source-text unit (638), gathers statistics on the source unit (639), moves the cursor to the end of the unit, and inserts a separator unit comprising a single space (e.g. ASCII 032) (641). To prepare for entry of the target text the process places the cursor between the source unit and separator unit (642), and reports the source unit statistics for information (640).

A subprocess (FIG. 14) moves the source unit to the top of the display by turning off screen refresh (644), selecting the source unit (645), and collapsing the selection to the start so that the cursor is immediately before the start of the source unit (646). The subprocess inserts and immediately deletes a space (647), and then turns on screen refresh (648).

A subprocess (FIG. 15) scans the source unit for special characters. From the start to the end of the source unit each character is read looking for character codes less than 32, which would indicate a non-printing control character or a character used for other special purposes such as a field, a graphic, etc. The process also tracks font color from one character to a next, used for determining text highlighting, (649 to 657 and 662 and 663). If only one special character is found the process copies this character for insertion by the user in the target text (651 to 653 and 653, 658, and 659). If more than one special character is found the subprocess stops with a message to the user that the source unit is too complex and must be processed manually (653 to 655).

A subprocess (FIG. 16) prepares for entry of the target text. The process moves the cursor to the end of the target text (664), if the color of the source-text unit was changed to a highlight color (665) then the process changes the color at the cursor to the target-text highlight color (667).

A subprocess (FIG. 18) stops the process (667) and control returns to the user for entry of target text (668).

The darker line connecting various blocks indicates the path of execution that, in one embodiment, is most frequent or that occurs in the absence of error conditions. This path includes steps 602, 607, 608, 609, 610, 613, 614, 617, 618, 624, 625, 626, 627, 628, 629, 632, 635, 636, 637, 638, 639, 640, 641, 642, 643, 644, 645, 646, 647, 648, 649, 650, 651, 656, 660, 661, 662, 663, 664, 665, 666, and 667.

FIG. 7 to FIG. 18 describe in detail the subprocesses that make up the process illustrated in FIG. 6.

Figure 7B:
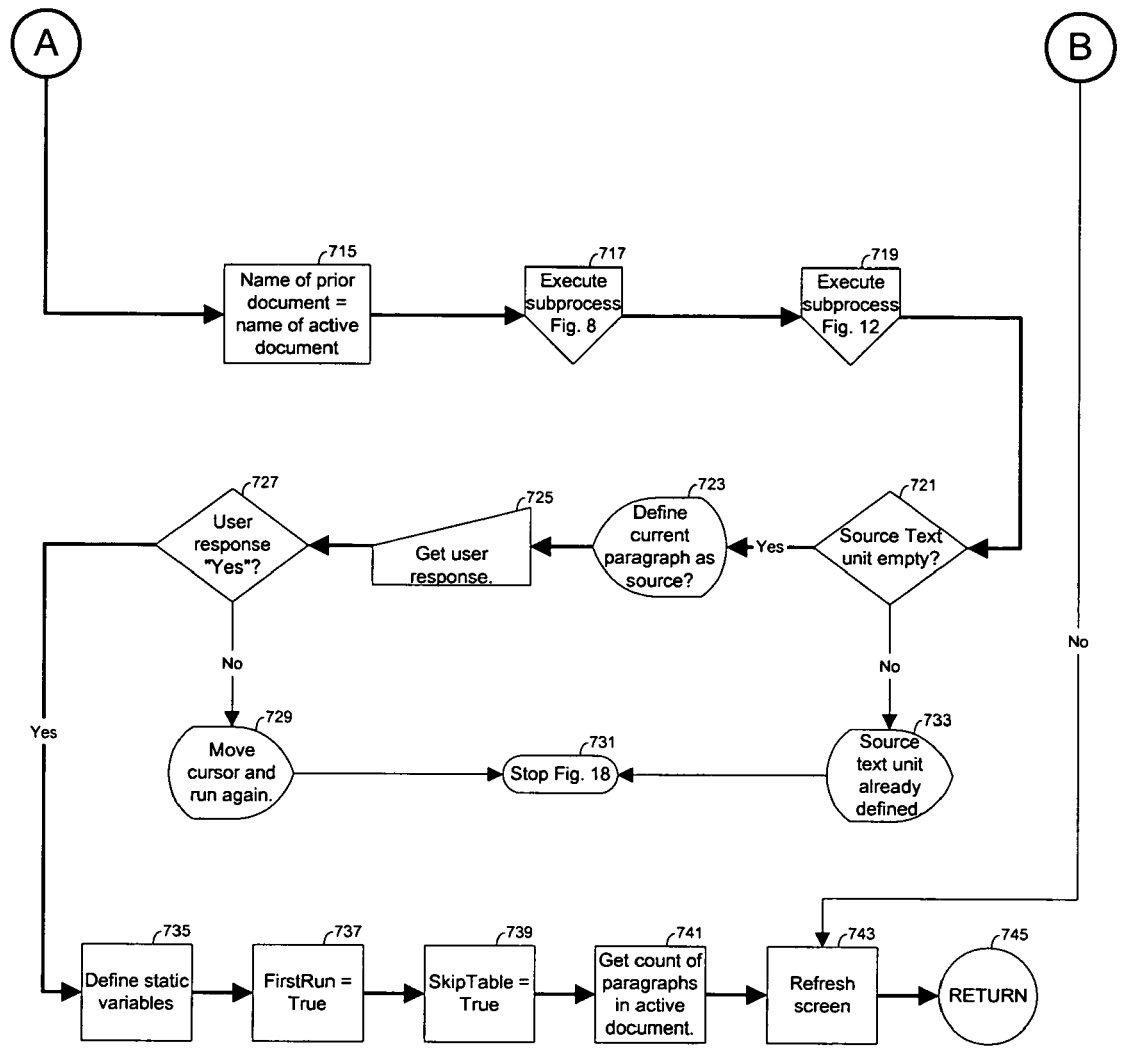

FIGS. 7A–7B show the steps in an embodiment of the subprocess used to determine if the current execution of the process is the first execution in a given document (701). If it is the first execution then the process does not have to do housekeeping tasks required because of entry of target text by the user, since in the first execution there is no previous target text. In this case the process must only define the starting source-text unit and then stop to allow entry of target text by the unit. All subsequent executions of the process will execute differently from the first execution but all such subsequent executions will perform exactly the same tasks.

The process reads the name of the active document kept by the system (703) and sets the flag used to store the first-run condition to false (705). The name of the active document and the name of the document in which the process was last executed are used to determine if the current execution of the process is the first or subsequent execution in a document. If the current document is not the same as the prior document, indicating that the user has switched from one document to another, or if the name of the prior document is undefined, indicating that the process is being executed for the first time (707), then the current execution is the first in a document. If it is not the first execution in a document there is nothing more for this subprocess to do and screen refreshing is turned on and the subprocess returns.

In FIG. 7 the process checks if the document is empty and if it is the process displays a message to this effect (709 and 711) and stops (713).

If the current execution is the first execution and the document is not empty, then the name of the prior document is set equal to the name of the current document (715) for use during subsequent executions of the process, the subprocess calls the subprocess that gets the number of the paragraph where the cursor is (717 and FIG. 8) and also calls the subprocess that finds the next non-empty paragraph (719 and FIG. 12).

As a check, the subprocess checks that the source-text unit is empty (721). If it is not, an error is indicated (733), and the process stops (731).

The subprocess asks the user if the paragraph where the cursor is should be used as the starting point and defined as the source-text unit (723). The process accepts the user input (725) and processes the response (727). If the user responds "no", a message informs the user to move the cursor and run the process again (729) and the process stops (731).

If the user indicates that the present paragraph is to be used as the starting point and defined as the source-text unit, the subprocess defines static variables needed in subsequent executions of the process (735), flags are set to true for first run condition (737) and skip table condition (739), the value of the read-only variable kept by the system with the number of paragraphs in the active document is stored (741), screen refreshing is turned on (743), and the subprocess stops and returns (745).

The darker line connecting various blocks indicates the path of execution that, in one embodiment, is most frequent or that occurs in the absence of error conditions. This path includes steps 703, 705, 707, 709, 715, 717, 719, 721, 723, 725, 727, 735, 737, 739, 741, 743, and 745.

One embodiment of the subprocess of FIG. 7 uses methods specific to the word-processing software used but other embodiments are possible. For instance, there are various ways to determine if the document is empty. One embodiment uses a read-only variable kept by the system that stores the length in number of characters of the main story of the document.

Figure 8:
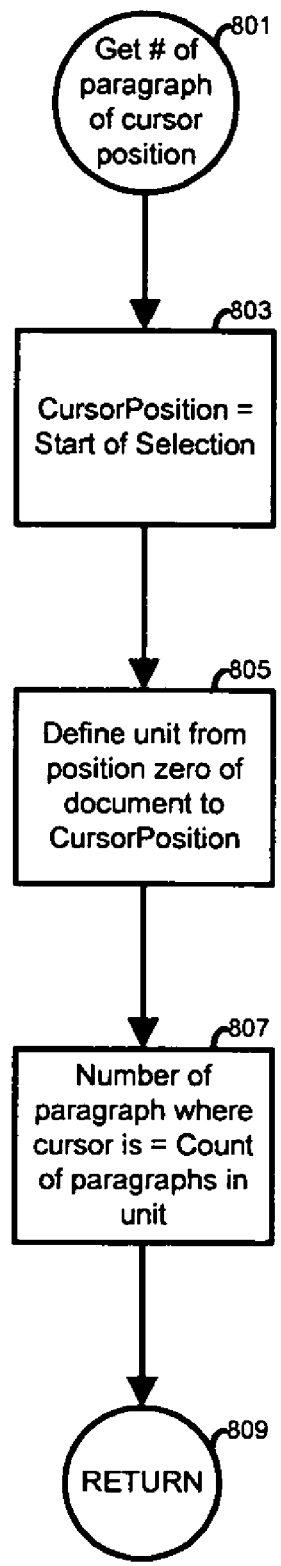
FIG. 8 illustrates a flowchart showing the steps in an embodiment of the subprocess used to determine the number of the paragraph in which the cursor is located.
Figure 9A:
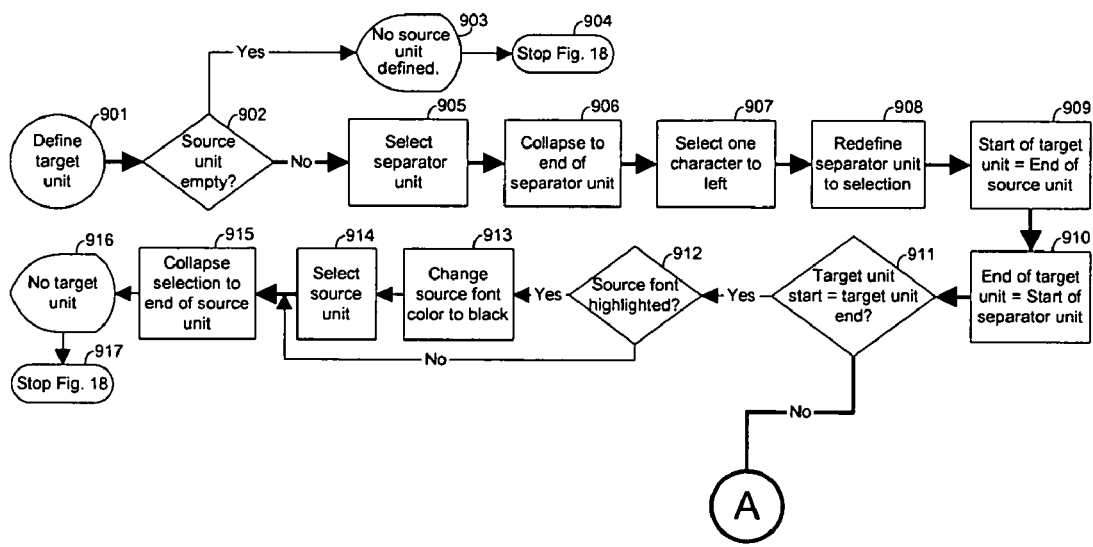
FIGS. 9A–9E illustrate a flowchart showing the steps in an embodiment of the subprocess used to define the unit of target text.
Figure 9B:
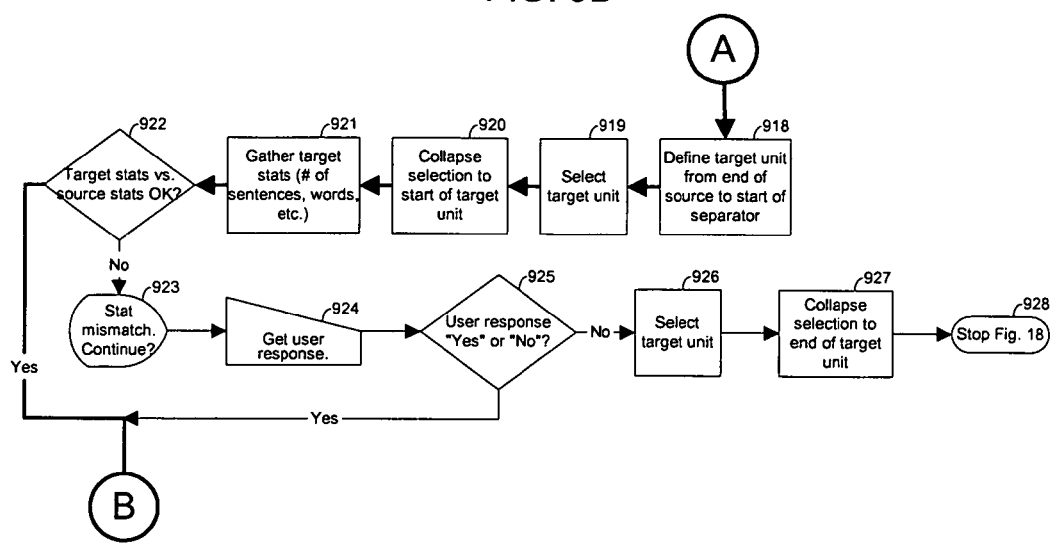
Figure 9C:
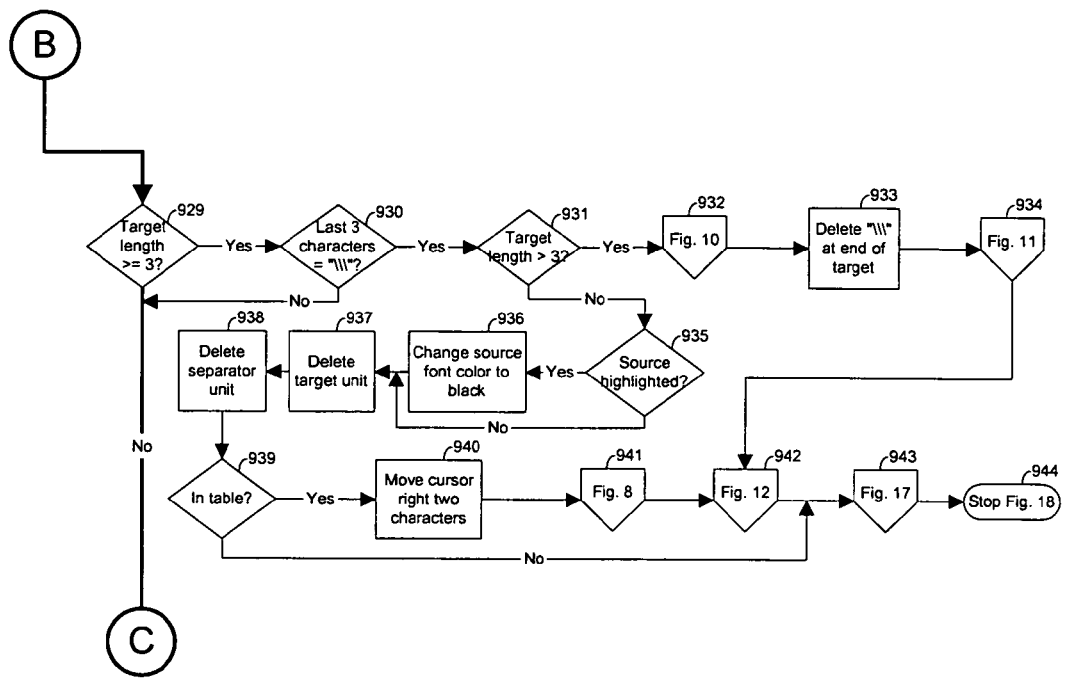
Figure 9D:
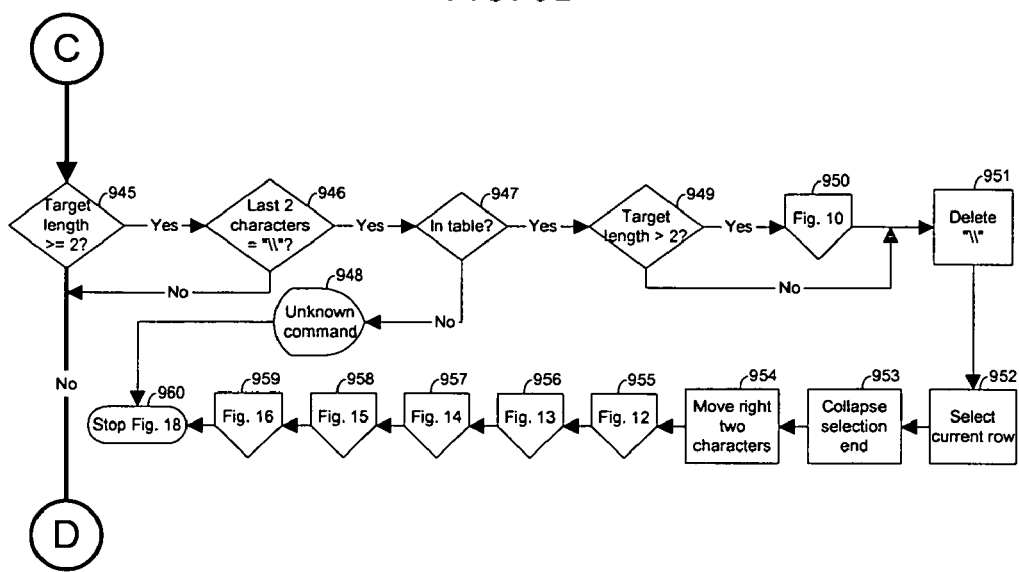
Figure 9E:
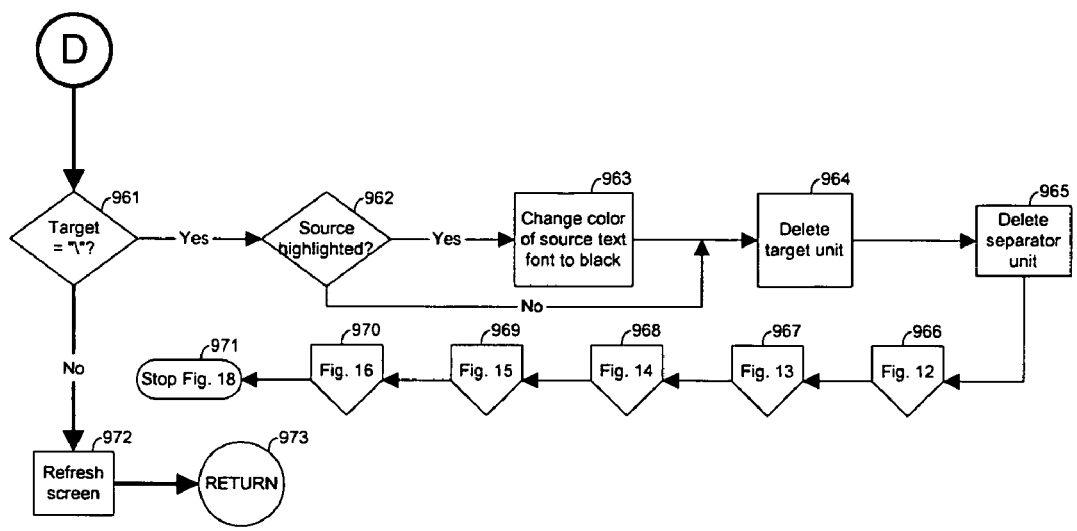

FIG. 8 illustrates the steps performed by an embodiment of the subprocess to determine the number of the paragraph where the cursor is (801).

The process stores the cursor position (803), defines a named unit in memory from the cursor position back to the beginning of the document (805), and stores the variable that the system creates when the named unit is defined, which system variable holds the number of paragraphs in this named unit (807). The subprocess ends and returns (809).

One embodiment of the subprocess of FIG. 8 uses information kept by the word-processing software for all documents but other embodiments are possible.

FIGS. 9A–9E show an embodiment of a subprocess to define the unit of target text (901).

The process checks if the source-text unit exists (902). If it does not, an error message is displayed (903) and the process stops (904). If the source-text unit exists, the process selects the separator unit (905), collapses the selection to the end of the unit (906), selects the preceding character (907), and redefines the separator unit (908). The process sets the variable holding the starting position of the target-text unit equal to the end of the source-text unit (909) and sets the variable holding the ending position of the target-text unit equal to the start of the separator unit (910).

The process checks if the target-text unit defined is empty (911). If it is empty, indicating an error, the process checks if the text in the source unit has font highlighting (912). If highlighting was applied to the font it is removed (913). The process selects the source-text unit (914), it collapses the selection of the source-text unit to the end (915), it displays an error message indicating no target text has been entered (916), and the process stops (917).

If the check made in step 911 indicates that the target-text unit is not empty, the process defines a named target text unit (918) using the variables from step 909 and step 910. The process selects the named target-text unit (919) and collapses the selection (920) so that the cursor is at the start of the target-text unit.

The process compiles the statistics for the target-text unit (922). If the statistics for the target-text unit versus the statistics for the source-text unit gathered in step 1309 are not acceptable, a query (923) asks the user whether to continue or to stop to allow editing of target-text unit, and the user's response is read (924 and 925).

If the user chooses not to continue, the process selects the target-text unit (926), it collapses the selection to the end (927), thus leaving the source-text and target-text units intact and the cursor position at the end of the target-text unit. The process then stops (928) to allow the user to edit the target text.

Figure 10:
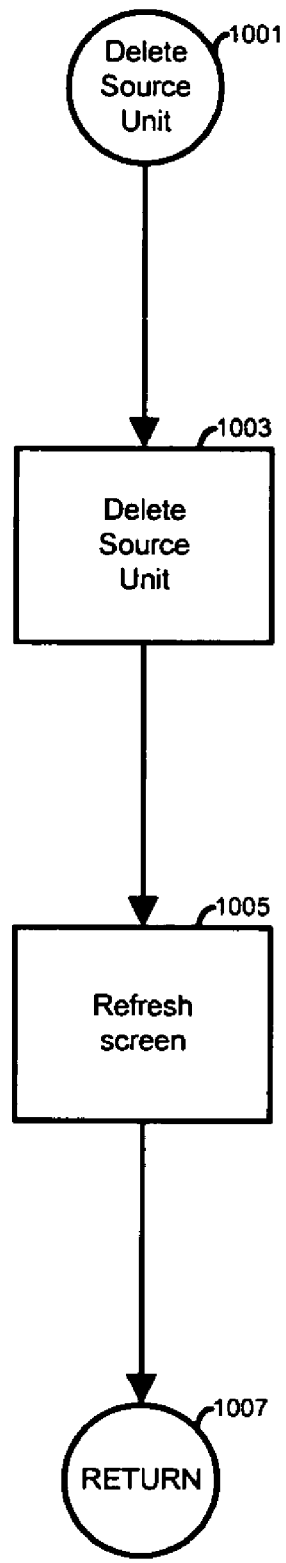
FIG. 10 illustrates a flowchart showing the steps in an embodiment of the subprocess used to delete the unit of source text defined.
Figure 11:
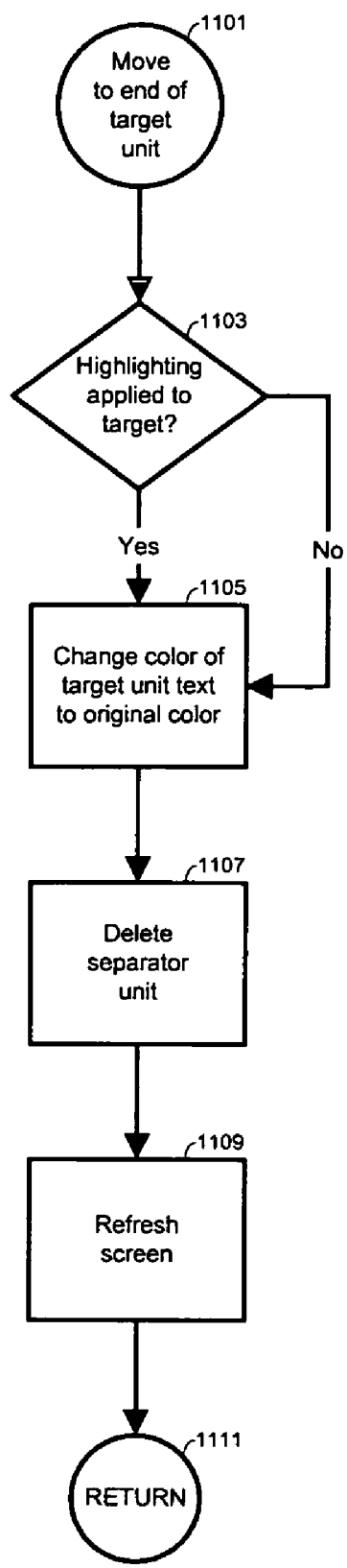
FIG. 11 illustrates a flowchart showing the steps in an embodiment of the subprocess used to move the cursor to the end of the unit of target text defined.
Figure 17:
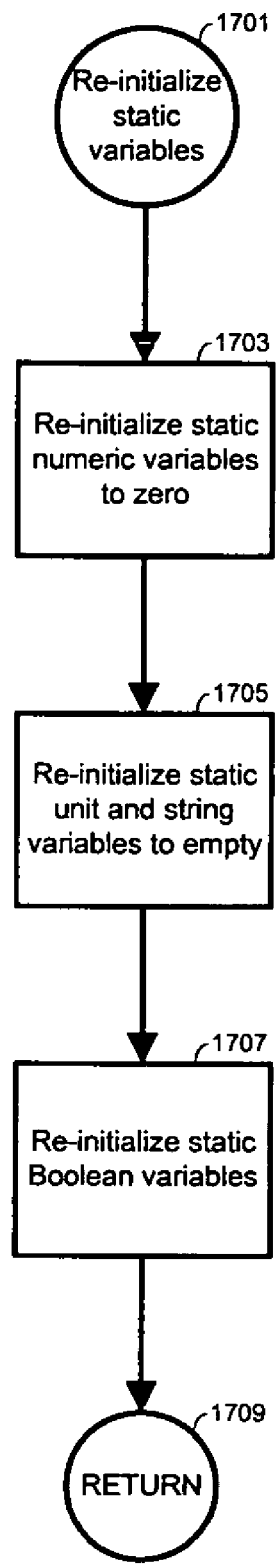
FIG. 17 illustrates a flowchart showing the steps in an embodiment of the subprocess used to re-initialize the static variables used by the various subprocesses.

If the user chooses to continue, the process proceeds to check the target-text unit for suffixes inserted by the user as instructions to the process. In one embodiment there are three possibilities for suffixes, as follows:

a) The process checks if the length of the target-text unit is greater than or equal to three characters (929). If it is not greater than or equal to three, processing skips to step 945. If this value is greater than or equal to three the process checks if the last three characters of the target-text unit are equal to three backslash ("\") characters (930). If they are not equal to three backslash ("\") characters, processing jumps to step 972, it turns on screen refreshing, and returns (973). If the last three characters are three backslash ("\") characters check if the length of the target-text unit is greater than three (931).

i) If the length of the target-text unit is greater than three (931) execute the subprocess detailed in FIG. 10 (932), to delete the source unit, delete the three backslash ("\") characters at the end of the target-text unit (933), execute the subprocess detailed in FIG. 11 (934), to move to the end of the target-text unit and delete the separator unit, execute the subprocess detailed in FIG. 12 (942), to find the next non-empty paragraph, execute the subprocess detailed in FIG. 17 (943), to re-initialize the static variables, and stop the process (944).

ii) If the length of the target-text unit is three or less (931), the process checks if highlighting has been applied to the source-text unit (935). If highlighting has been applied change the color of the source-text unit (936). In either case delete the target-text unit (937), and delete the separator unit (938). Check if the cursor is in a table (939). If the cursor is in a table move the cursor two characters forward (940), execute the subprocess detailed in FIG. 8 (941), to determine the number of the paragraph where the cursor is, execute the subprocess detailed in FIG. 12 (942), to find the next non-empty paragraph, execute the subprocess detailed in FIG. 17 (943), to re-initialize the static variables, and stop the process (944). If the cursor is not in a table (939), skip steps 940, 941, and 942, and execute the subprocess detailed in FIG. 17 (943), to re-initialize the static variables, and stop the process (944).

b) The process checks if the number of characters in the target-text unit is greater than or equal to two (945). If the last two characters are not equal to two backslash characters ("\") (946), the process jumps to step 961. If the last two characters in the target-text unit are backslash characters ("\") (946), the process checks if the defined source-text unit is in a table (947). If it is not in a table, it displays an error message (948) and stops (960). If it is in a table (947) it checks if the length of the target-text unit is greater than two (949). If it is greater than two, meaning the two backslashes have been added to the end of the target-text unit, the process calls the subprocess detailed in FIG. 10 (950), to delete the source text. In either case the process then deletes the two backslashes (951), it selects the current row in the table (952), it collapses the selection to the end (953), it moves the cursor, for example, two or three characters forward (954), to thus move the cursor either to the next row in the table or out of the table. The process then calls the subprocesses detailed in FIG. 12 (955), FIG. 13 (956), FIG. 14 (957), FIG. 15 (958), and FIG. 16 (959), for the purpose of moving forward to the next non-empty paragraph and preparing for the insertion of target text by the user. The process then stops (960).

c) The process checks if the one character, by exclusion from steps 912, 929, and 945, of the target text is a backslash character ("\") (961). If this character is not a backslash character ("\") (961), skip to step 972, refresh the screen, and return (973). If the character is a backslash character, which character is interpreted to mean skip the source-text unit defined leaving it intact and move to the next source-text unit, the process checks if highlighting has been applied to the source-text unit (962). If so, change the color of the source-text unit back to the original color (963). In either case, whether or not highlighting was applied to the source-text unit, the process deletes the target-text unit (964) and the separator unit (965). The process then calls the subprocesses detailed in FIG. 12 (966), FIG. 13 (967), FIG. 14 (968), FIG. 15 (969), and FIG. 16 (970), for the purpose of moving forward to the next non-empty paragraph and preparing for the insertion of target text by the user. The process then stops (971).

In FIG. 9 the darker line connecting various blocks indicates the path of execution that is, in one embodiment, most frequent or that occurs in the absence of error conditions. This path includes steps 902, 905, 906, 907, 908, 909, 910, 911, 918, 919, 920, 921, 922, 929, 945, 961, 972, and 973.

One embodiment of this subprocess uses counts of characters, words, and sentences kept by the word-processing software to determine if the target-text unit has the same number of sentences as the source-text unit, to attempt to prevent the user from skipping text. Additional embodiments enhance this feature by, for example, keeping a running count of the percentage of contraction or expansion of the target-text unit versus the source-text unit and reporting when the value for a given unit of text has exceeded an allowable deviation, versus the cumulative statistic kept by the process. Many other useful checks could be made and the user could customize the amount and reporting of such information.

One embodiment of the subprocess of FIG. 9 further uses suffixes appended to the target-text unit by the user to communicate special instructions to the process. The embodiment implements processing for three suffixes to:

a) skip a unit of source text, that is to leave the source-text unit in place, remove any target text entered by the user, remove the suffix, and continue forward in the document;

b) skip a row in a table and continue processing at the start of the next row of the table or in the next paragraph outside of the table, especially useful for financial or technical documents in which only the first column in a table would contain text to be translated, other columns containing just numbers, and c) end the process prematurely, useful for stopping, whereby the process checks if the user has entered target text and, if so, removes the corresponding source-text unit, in either case then removing the suffix and leaving the cursor in the next non-empty paragraph. This embodiment was chosen for its ease of use and speed. Alternative embodiments of this set of features are numerous including but not limited to assigning the various processes listed to one or more keys on the keyboard, to a voice command, to another process, to an icon, etc. and augmenting the number of alternatives.

FIG. 10 details an embodiment of a subprocess to delete the source-text unit (1001).

The process deletes the source-text unit (1003), refreshes the screen (1005), and returns (1007).

An embodiment of this subprocess takes advantage of the built-in features of the word-processing software. Alternative embodiments of this subprocess are possible.

FIG. 11 details an embodiment of a subprocess to move to the end of the target-text unit (1101).

The process checks whether highlighting has been applied to the unit (1103). If so, the process changes the color of the target to the original color (1105). In either case, whether or not highlighting has been applied, the process deletes the separator unit (1107), refreshes the screen (1109), and returns (1111).

One embodiment of this subprocess takes advantage of the built-in features of the word-processing software. Alternative embodiments are possible.

Figure 12A:
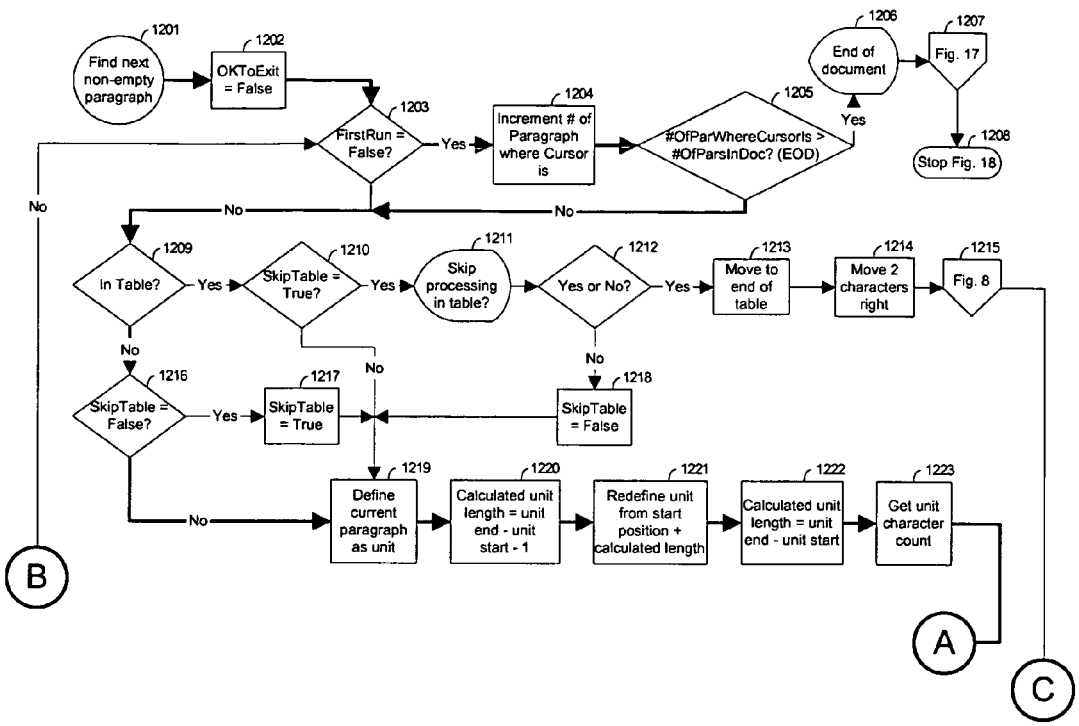
FIGS. 12A–12C illustrate a flowchart showing the steps in an embodiment of the subprocess used to find the next non-empty paragraph of source text.
Figure 12B:
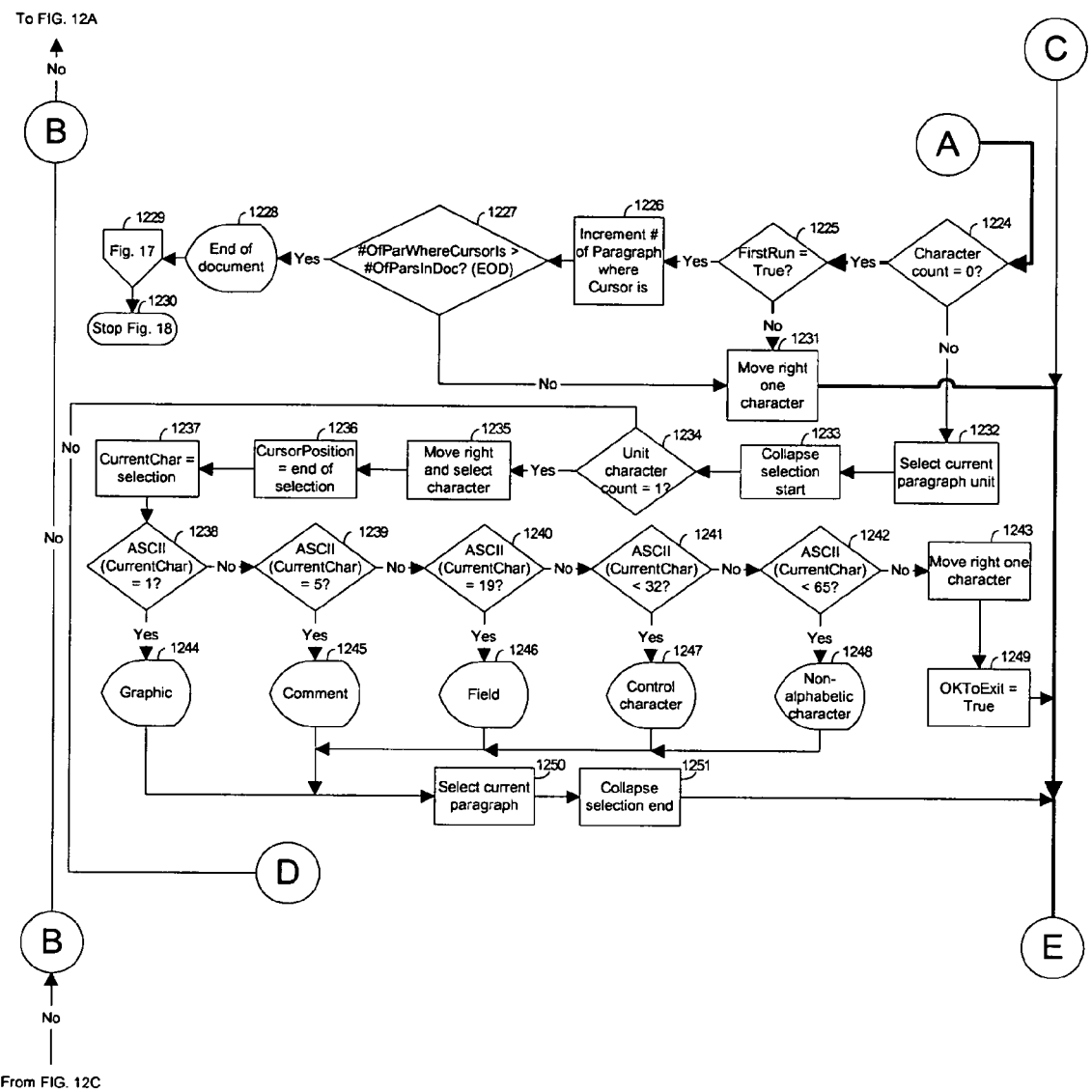
Figure 12C:
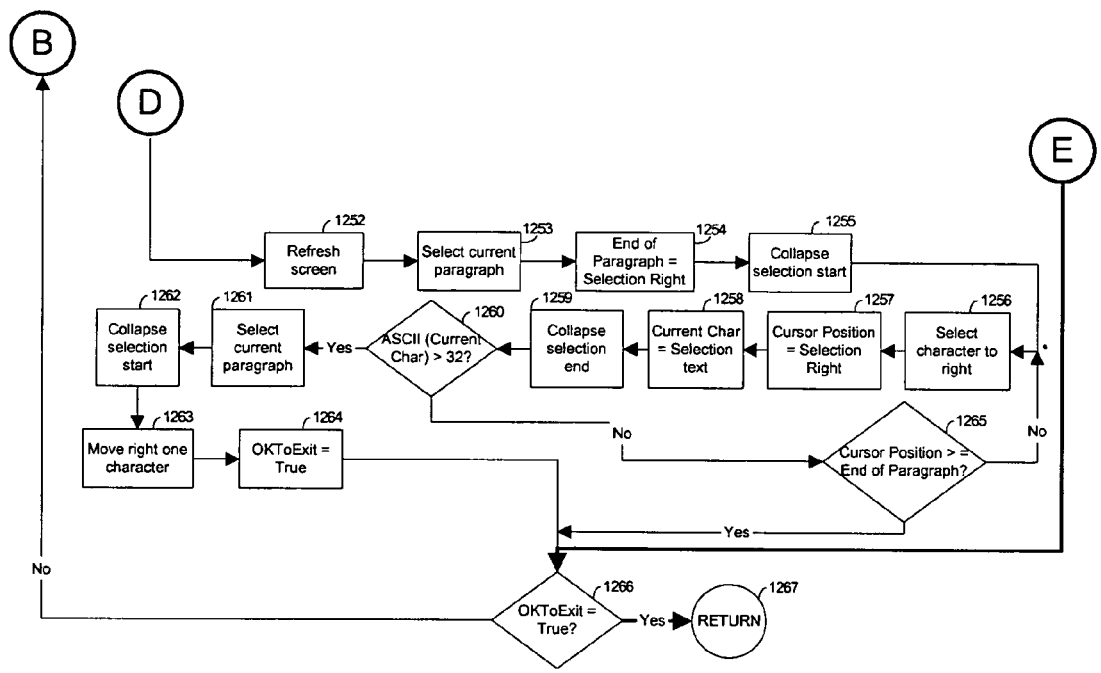

FIGS. 12A–12C detail an embodiment of a subprocess to move forward in the document and find the next non-empty paragraph (1201).

The process sets an exit flag to false (1202).

In step 1203 the process checks whether the current execution is the first execution in the current document.

If the current execution is the first execution in the current document (1203), the process increments the number of the paragraph where the cursor is (1204). The process checks if the number of the paragraph where the cursor is greater than the number of paragraphs in the document (1205). If this is the case, an end-of-document message is displayed (1206), the subprocess detailed in FIG. 17 (1207) executes, to re-initialize static variables, and the process stops (1208).

If the current execution is not the first execution in the active document (1203) or the number of the paragraph where the cursor is, is less than the number of paragraphs in the document (1205), the process checks if the cursor is in a table (1209).

a. If the cursor is in a table (1209), the process checks the flag for the skip table condition (1210). If the skip-table flag is false the process moves to step 1219. If the flag is true the user is asked whether or not to skip the entire table (1211). The process checks the user's response (1212). If the response is no, the skip-table flag is toggled to false (1218) and the process moves to step 1219. If the response is yes, the entire table is selected and the selection is collapsed to the end (1213), the cursor is moved two characters forward (1214), the subprocess detailed in FIG. 8 (1215) is executed, to get the number of paragraph where the cursor is, and execution skips to step 1266 below.

b. If the cursor is not in a table (1209), the process checks the status of the skip-table flag (1216). If the flag is false the process toggles skip table flag to true (1217). If the flag is true the process jumps to step 1219.

In step 1219 the process defines the current paragraph as a unit, it calculates the length of this unit by subtracting the unit end position from the unit start position and subtracting one (1220), it redefines the unit from the start position plus the length calculated in step 1220 (1221). The process reads the variable kept by the system that contains the count of characters in the unit defined (1223). The process checks if the character-count read in step 1223 is equal to zero (1224).

If the character count is equal to zero (1224), the process checks if the current execution is the first execution in the active document (1225).

a) If it is the first execution it increments the number of the paragraph where the cursor is (1226), if the number of the paragraph where the cursor is, is greater than the number of paragraphs in the document (1227), it displays the end-of-document message (1228), execution transfers to the subprocess detailed in FIG. 17 (1229), to re-initialize static variables, and the process stops (1230).

b) If the current execution is not the first execution in the active document (1224) or if the number of the paragraph where the cursor is, is not greater than the number of paragraphs in the document (1227), the process moves the cursor forward one character (1231), and execution skips to step 1266 below.

If the character count is not equal to zero (1224), the process selects the current paragraph unit (1232), it collapses the selection to the start (1233), and it checks if the number of the characters in the unit is equal to one (1234).

a) If the number of characters is equal to one (1234), the process selects the next character forward (1235), stores the end-of-selection position as the cursor position (1236), and stores the selection as the current character (1237). The process then checks for specific character codes as follows:

i) If the code of the current character is 1 (1238) display a message indicating that the unit contains a graphic (1244) and continue execution at step 1250, otherwise continue.

ii) If the code of the current character is 5 (1239) display a message indicating that the unit contains a comment (1245) and continue execution at step 1250, otherwise continue.

iii) If the code of the current character is 19 (1240) display a message indicating that the unit contains a field (1246) and continue execution at step 1250, otherwise continue.

iv) If the code of the current character is less than 32 (1241) display a message indicating that the unit contains a control character (1247) and continue execution at step 1250, otherwise continue.

v) If the code of the current character is less than 65 (1242) display a message indicating the unit contains a non-alphabetic character (1248) and continue execution at step 1250, otherwise continue.

vi) Move the cursor forward one character (1243), toggle the exit flag to true (1249), and continue execution at step 1266.

b) In step 1250 the process selects the current paragraph and collapses the selection to the end (1251), to leave the cursor at the end of the paragraph, and execution continues at step 1266.

If the number of characters in the unit defined is not equal to one (1234), the process refreshes the screen (1252), selects the current paragraph (1253), and stores the end of the selection position as the end-of-paragraph position (1254).

In step 1255 the process collapses the selection to the start, selects the next character forward (1256), stores the selection-end-position as the cursor position (1257), stores the selection as the current character (1258), collapses the selection to the end (1259), and checks the code of the current character (1260).

a) If the code of the current character is greater than 32 (1260), the process selects the current paragraph (1261), collapses the selection to the start (1262), moves the cursor forward one character (1263), toggles the exit flag to true (1264), and execution continues at step 1266.

b) If the code of the current character is less than or equal to 32 (1260) the process checks if the cursor position is greater than or equal to the end of paragraph position (1265). If the cursor position is less than the end of paragraph position execution returns to step 1255, looping until the process has checked all characters in the paragraph. If the cursor position is greater than the end-of-paragraph position (1265) execution continues at step 1266.

In step 1266 the process checks if the exit flag is true (1266). If the flag is true the subprocess returns (1267) and if it is false execution continues at step 1203.

In FIG. 12 the darker line connecting various blocks indicates the path of execution that, in one embodiment, is most frequent or that occurs in the absence of error conditions. This path includes steps 1202, 1203, 1204, 1205, 1209, 1216, 1219, 1220, 1221, 1222, 1223, 1224, 1225, 1231, 1266, possibly returning to step 1203, and 1267.

One embodiment of the subprocess of FIG. 12 uses system and process variables to determine when the last source-text unit has been processed but alternative processes, not based on the same units, could read the end-of-file variable directly.

The embodiment relies on decimal ASCII codes of individual characters to find and check for items like non-printing control characters, in-line graphics, and fields containing, as single characters, software generated tables of contents, indexes, user-inserted comments, and the like. It also uses the ASCII system for determining candidate source-text units that do not contain alphabetic characters but just numbers and punctuation. These conventions also apply to documents that are coded using Unicode, thus the process claimed herein works without modification for such documents. Alternative embodiments of this subprocess deal with different or additional conventions.

The embodiment takes advantage of the tracking by the word-processing software of paragraphs within a document, in much the same way that database management software tracks records within a file and fields within records. Thus the embodiment allows fast selection of the next unit for processing. Alternative embodiments may have to deal with other internally defined units such as sentences. A drawback to using sentences as the unit of processing is that it is occasionally difficult to determine the exact extent of a sentence due to abbreviations, numbers, etc. A further drawback of this approach is that it is common during translation for experienced translators, for instance, to combine two sentences in the source-text unit into one sentence in the target-text unit or to split a single sentence in the source-text unit into more than one sentence in the target-text unit. An additional embodiment of the process uses a table-based approach whereby the source document is decomposed into its constituent sentences, the sentences are then placed into a table, and the table is processed using a variant of the process claimed to insert corresponding target text, and then to re-assemble the source document sentence-by-sentence using the target text, and many other time-saving features. This table approach is very useful for projects involving multiple documents all in the same subject field.

Figure 13:
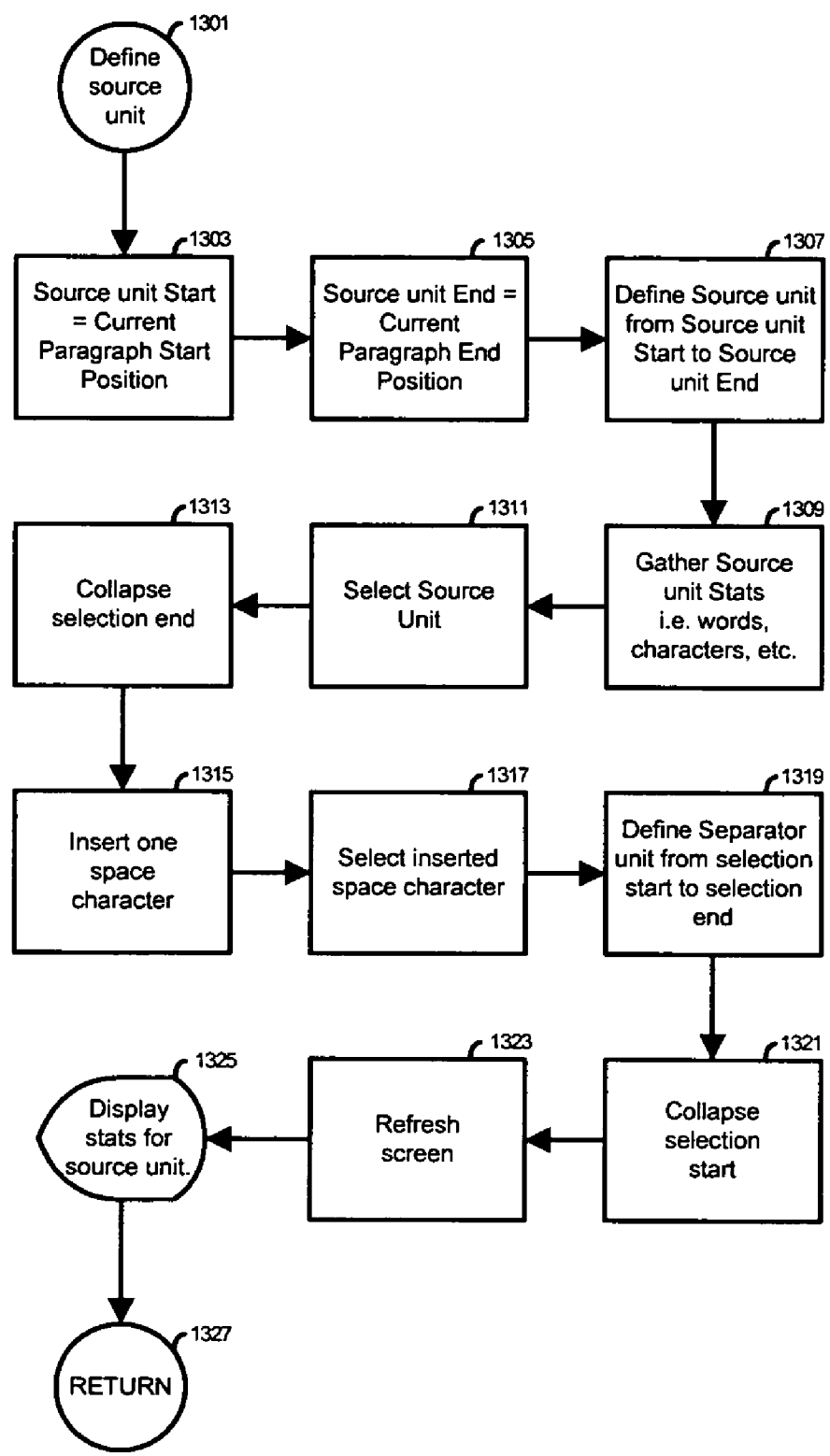
FIG. 13 illustrates a flowchart showing the steps in an embodiment of the subprocess used to define the unit of source text.

FIG. 13 details an embodiment of a subprocess to define a source-text unit (1301).

The process assigns the start position of the current paragraph (1220) to the source-unit start (1303), and the end position of the current paragraph (1254) to the source-unit-end variable (1305). The process defines a source unit from the source-unit start to the source-unit end positions (1307). The process harvests the statistics from the source unit defined (1309). The process selects the source unit (1311) and collapses the selection to the end (1313) to leave the cursor at the end of the source unit. The process inserts a space character at the end of the source unit (1315) and selects the space character inserted (1317). The process defines a separator unit from the selection start position to the selection end position (1319). The process collapses the selection to the start (1321), refreshes the screen (1323), displays the source-unit statistics in a way that does not require action by the user (1325), and then the subprocess returns (1327).

One embodiment of the process uses the named separator unit defined in this subprocess to separate first the source-text unit and later the target-text unit from the end-of-paragraph marker used in the word-processing software, thereby providing a fast way for the process to locate first the end of the source-text unit and later the end of the target-text unit, and to prevent changing of this end-of-paragraph marker, which contains the formatting information for the paragraph. This method is also useful in tables since by design of the word-processing software it is impossible to select the end-of-cell marker in a table without selecting the contents of the cell also. Alternative embodiments of the process employ other methods to achieve the same result depending on the environment in which they operate.

Figure 14:
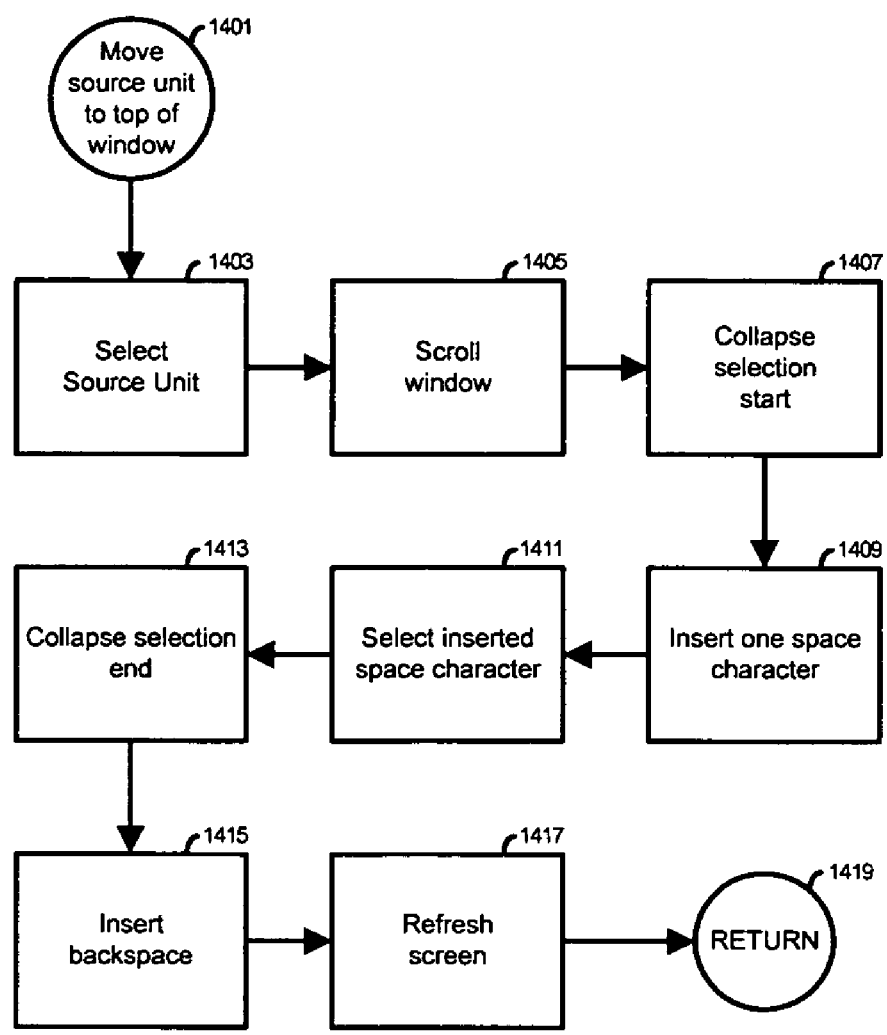
FIG. 14 illustrates a flowchart showing the steps in an embodiment of the subprocess used to move the unit of source text defined to the top of the active window.

FIG. 14 details an embodiment of a subprocess to move the source-text unit to the top of the active window (1401).

The subprocess selects the source-text unit (1403), issues a scroll window command (1405), and collapses the selection to the start (1405). The process then inserts a space character at the cursor (1409). The process selects the inserted space character (1411), collapses the selection to the end (1413), and then deletes the character (1415) to leave the source-text unit unchanged and at the top of the display. The process lastly refreshes the screen (1417) and returns (1419).

One embodiment uses the process outlined as a way of quickly repositioning the text on the screen without having to deal with the calculations involved for font size, line spacing, etc. Alternative embodiments implement different processes to achieve this result.

Figure 15A:
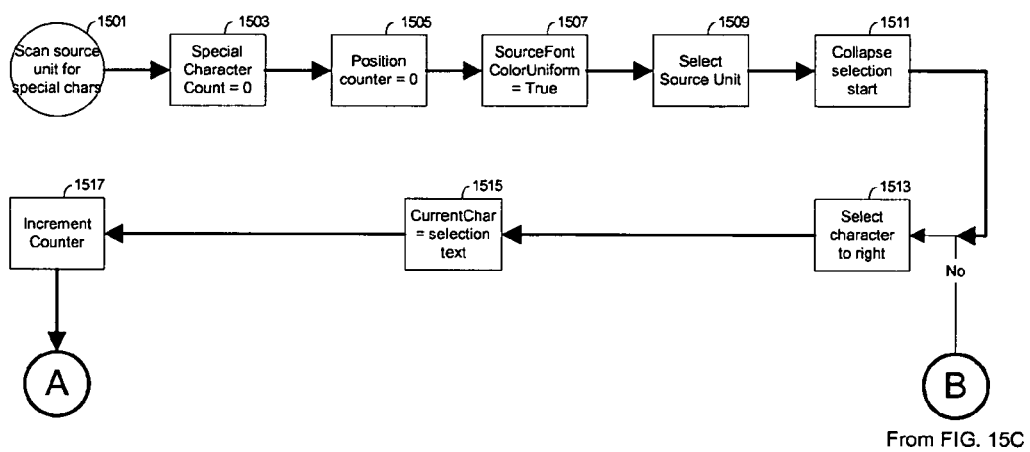
FIGS. 15A–15C illustrate a flowchart showing the steps in an embodiment of the subprocess used to scan each character of the unit of source text defined looking for control and similar characters.
Figure 15B:
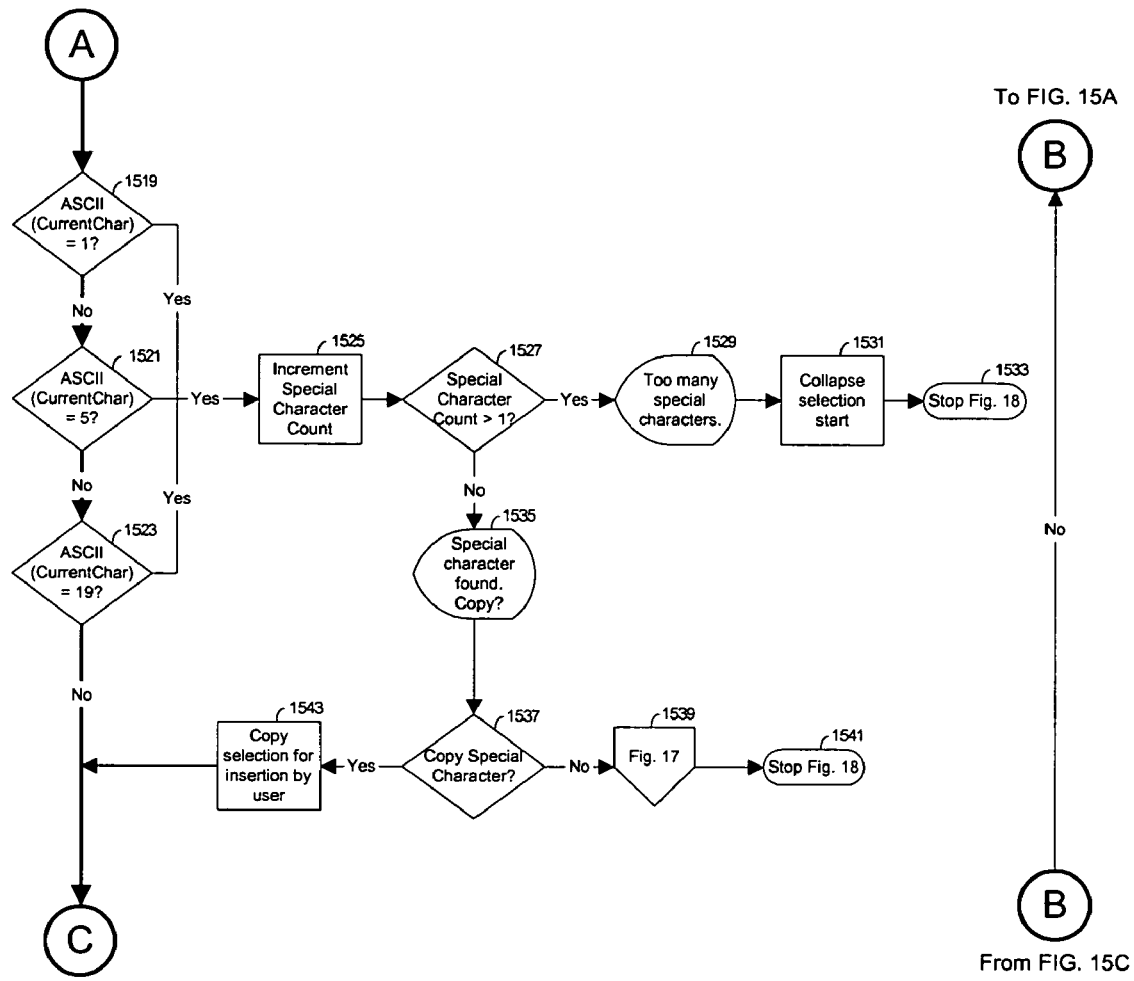
Figure 15C:
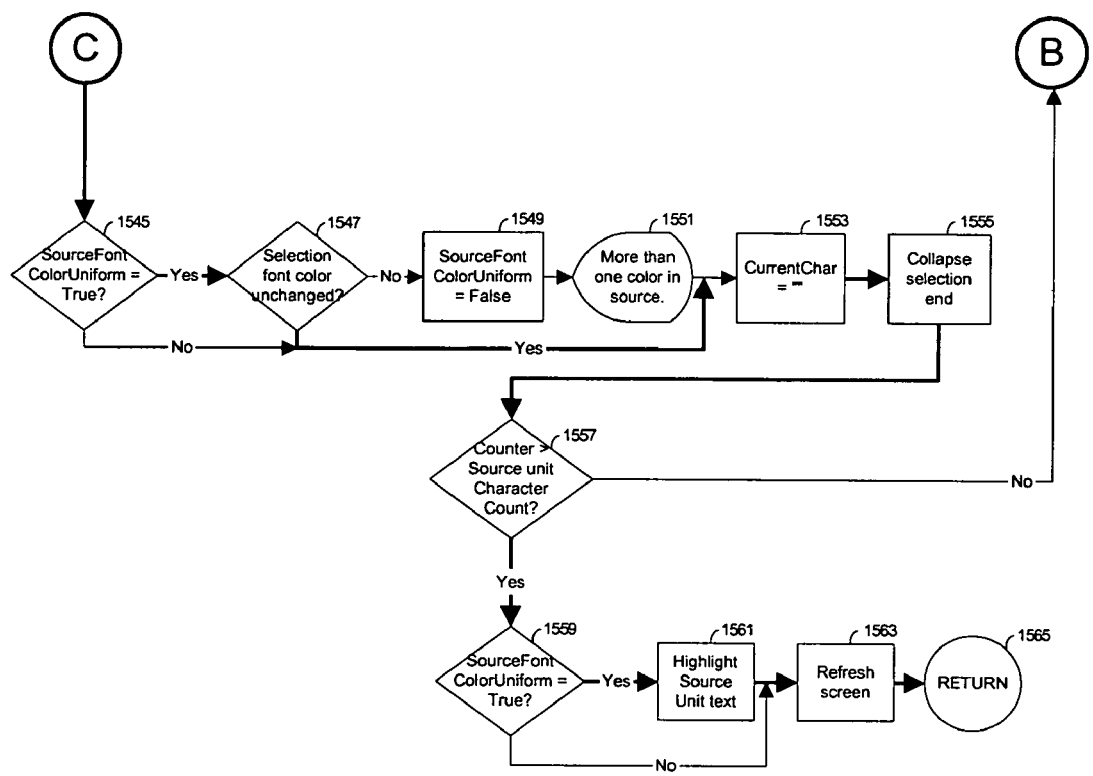

FIGS. 15A–15C detail an embodiment of a subprocess to scan the source-text unit for special characters (1501).

The process sets a counter for special characters to zero (1503). The process sets a position counter for determining position in the source-text unit to zero (1505). The process sets the flag for source-text unit font color uniformity to true (1507). The process selects the source-text unit (1509), collapses the selection to the start (1511), and selects the next character forward (1513). The process assigns the character selected to a current character variable (1515) and increments the position counter (1517).

The process checks the code of the current character (1519, 1521, and 1523).

Figure 18:
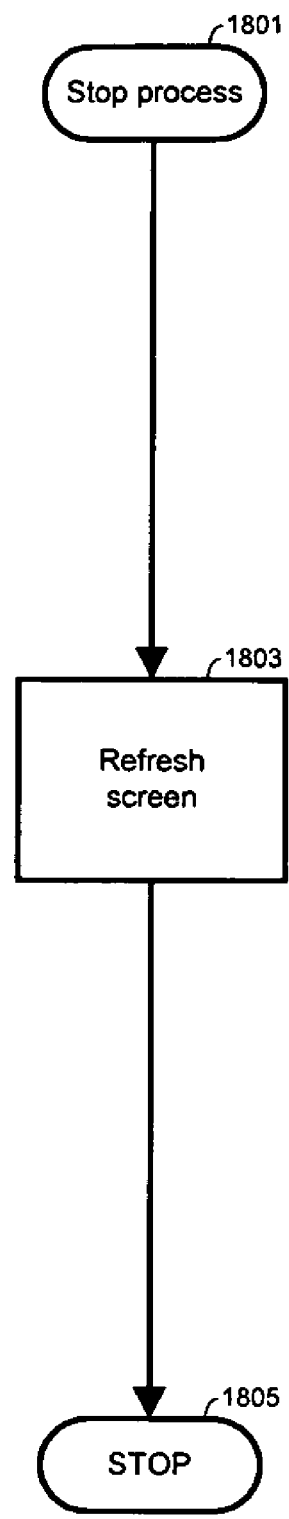
FIG. 18 illustrates a flowchart showing the steps in an embodiment of the subprocess used to stop execution of the process and return control to the user.

If the code is 1, 5, or 19, or other codes in one embodiment, the process increments the special character counter (1525) and checks if the special character counter is greater than 1 (1527).

a) If the counter is greater than 1 (1527), the process displays a message indicating that too many special characters have been found (1529), the process collapses the selection to the start (1531), and stops (1533).

b) If the counter is 1 the process displays a message indicating that a special character has been found and asking the user if the process should copy the special character for insertion by the user (1535). The process checks the user's response (1537).

i) If the user's response is no the process executes the subprocess detailed in FIG. 17 (1539), to re-initialize the static variables, and then the subprocess detailed in FIG. 18 (1541), to stop the process.

ii) If the user's response is yes the process copies the selected special character for insertion by the user at the proper place in the target-text unit (1543). Execution continues at step 1545.

In step 1545, if the code of the selected character is not 1, 5, or 19 the process checks the flag for uniformity of the source-text unit font color (1545).
- a) If the flag is true the process checks if the color of the font of the selected character is uniform (1547). If the flag is false execution continues at step 1553.
- b) If the color of the font of the current character is not uniform the process sets the flag for uniformity of the source-text unit font color to false (1549) and displays a message not requiring user response that the font of the characters in the source-text unit are of more than one color (1551). Execution continues at step 1553.

In step 1553 the process re-initializes the variable containing the current character and collapses the selection to the end (1555).

The process checks if the position counter value is greater than the source-text unit character count (1557).
- a) If the counter is greater than the source-text-unit character count execution returns to step 1513.
- b) If the counter is less than or equal to the source-text-unit character count the process checks the status of the flag for uniformity of the source-text unit font color (1559).
  - i) If the flag is true the process turns on highlighting for the source-text unit (1561) and continues.

In either case, whether or not highlighting is applied to the source-text unit, the process issues the screen refresh command (1563) and returns (1565).

In FIG. 15 the darker line connecting various blocks indicates the path of execution that is, in one embodiment, most frequent or that occurs in the absence of error conditions. This path includes steps 1503, 1505, 1507, 1509, 1511, 1513, 1515, 1517, 1519, 1521, 1523, 1545, 1547, 1553, 1555, 1557, 1559, 1561, and 1563.

One embodiment checks for the occurrence of characters in the defined source-text unit that the user cannot recreate using the input means and methods available, such as in-line graphics and fields. If only one such character is found in the source-text unit it is copied to a holding area called the clipboard in the software of the embodiment, from which area the user can easily insert the character into the target-text unit at the proper place. Since it is likely that such characters will occur in a relatively different place in the target-text unit than in the source-text unit, if more than one such character is found in the source-text unit the user is notified that the paragraph cannot be processed by the process and must be handled manually. The subprocess operates this way in the interest of speed since otherwise the process would require that a plurality of such characters be assigned to different storage and then recalled in a possibly different sequence by the user for insertion. Alternative embodiments of this subprocess use a visible stack to allow the user to see which characters have been inserted and which have not, or other methods.

Figure 16:
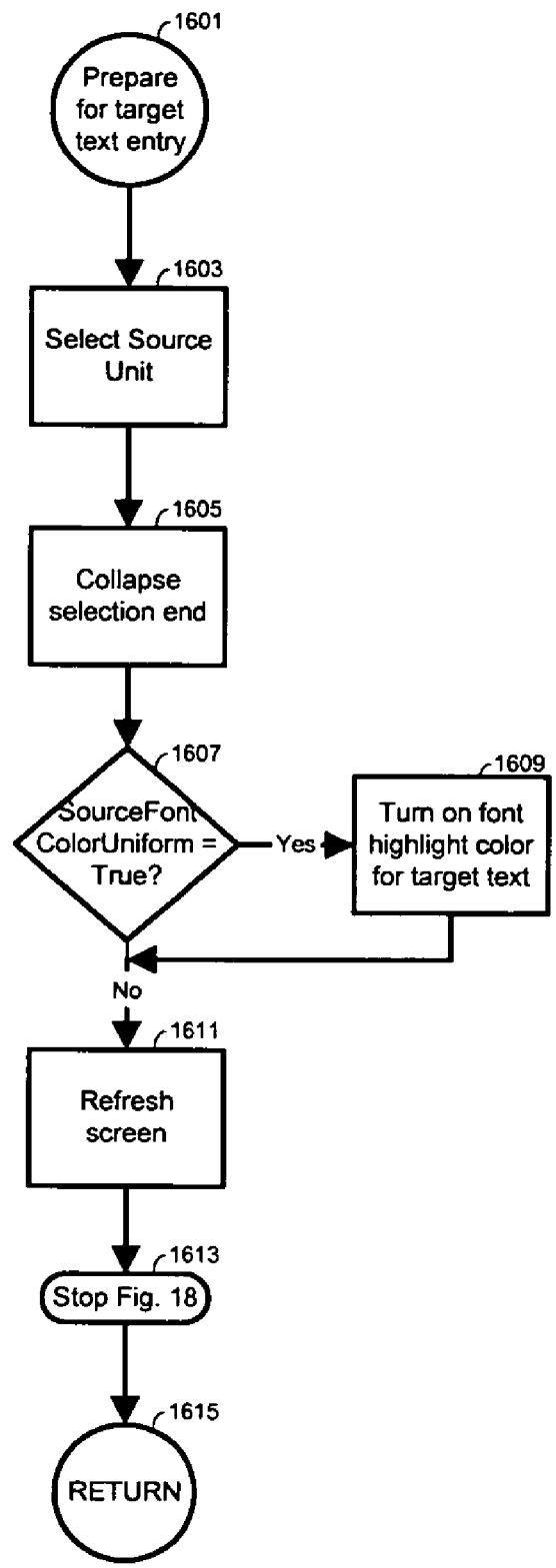
FIG. 16 illustrates a flowchart showing the steps in an embodiment of the subprocess used to prepare for entry of target text.

FIG. 16 details an embodiment of a subprocess to prepare for entry of target text (1601).

The process selects the source-text unit (1603) and collapses the selection to the end (1605), leaving the cursor after the source-text unit and before the separator unit defined previously.

The process checks the flag for uniformity of the source-text unit font color (1607). If the flag is false execution continues with step 1611.
- a) If the flag is true the process turns on highlighting for the target-text unit (1609) and continues.

In step 1611 the process issues the command to refresh the screen and then stops (1613).

In FIG. 16 the darker line connecting various blocks indicates the path of execution that, in one embodiment, is most frequent or that occurs in the absence of error conditions. This path includes steps 1603, 1605, 1607, 1609, 1611, and 1613.

FIG. 17 details an embodiment of a subprocess to re-initialize static variables (1701).

The process re-initializes the variables needed to run the process over and over to zero (1703), empty (1705), or the empty value for Boolean variables (1707), and then returns (1709).

FIG. 18 details an embodiment of a subprocess to stop the process and return control to the user (1801).

The process issues the command to refresh the screen (1803) and then stops (1805).

One embodiment of the overall process described herein is to implement the process on a personal computer using, for example, a Pentium processor, memory, keyboard, audio input and output, video display, mouse, and the Microsoft Word word-processor. The process identifies as units of text to be translated paragraphs. A paragraph is defined by the word processor as a section of text not containing a carriage-return/line-feed character (decimal character code 013/011) that is followed by a carriage-return/line-feed character (code 013/011). The word-processor numbers such paragraphs internally. The locations of the starting and ending points of the paragraph, such locations being defined as the number of characters from the beginning of the document, are further used to define a source-text unit. The unit so defined can be treated as a coherent entity and manipulated as an entity using commands provided by the programming language available in the word-processing software.

The process described could be implemented to run under other operating systems and in other word processors. It could be implemented in a client-server environment, in which the server may be local or remote to the user, whereby a user could upload a file containing source text to a server. The server could then make available the process described herein, as well as other processes, to aid in the translation process to many users at the same time, and it could be implemented in a voice-recognition environment.

The source-text unit defined by this process could also be a sentence, as defined by the word processor. If the length of the paragraph defined as source-text unit is too long to fit on the display device at a convenient magnification, it is necessary to switch to this definition to allow the user to be able to see both source text and target text on the same screen.

The text entered by the user may be entered in many ways, among them entry using the keyboard, entry using shortcuts defined by the word processor, copying of text from another source and pasting such text into the subject document, entry using a voice-recognition system, or partial entry using local or remote on-line content provided through links or tags in the text.

The process of the present invention works with languages that use the Roman alphabet and also works with languages using multi-byte internal character representations, such as Chinese, and with other writing systems, for instance right-to-left-reading languages such as Hebrew, and automatic language detection for the source-text unit can be added, if necessary, and for the target-text unit.

The process is of great utility in translating HTML files for websites or SGML files. HTML files are made up of a series of bracket-delimited statements. Many such statements are for machine control and communication and do not contain text that is displayed in the page in question. Accordingly, the present process, customized to look for and to parse such tags, could be made to highlight only text requiring translation, skipping tags that do not contain translatable text. The process so implemented could move quickly through the HTML file saving the laborious process of manually searching for tags containing translatable text or other processes. The process could work as described herein or could perform only preprocessing of the HTML, whereby the translatable text within the various tags could be highlighted in some way and the file then saved for later processing, further implementing a process to systematically move through the file to such highlighted areas, allow insertion of target-language text, and deletion of the corresponding source-language, using methods similar to those described herein, such as summaries of patents and technical articles.

The process may also be useful in other work environments such as, but not limited to, medical and legal transcription, where source text, not necessarily in a foreign language, has to be read and responded to in some way, or summarizing paragraphs of text manually.

From the descriptions above a number of advantages of the use of the processes of the present invention become evident:

(a) The process produces intermediate results.
(b) The accumulation of intermediate results produces a final result.
(c) The process does not require software in addition to the word processing software already installed in one embodiment.
(d) The process requires very little training to use properly and allows the user to continue to use know-how already acquired.
(e) The process eliminates the need to work from paper and the time-consuming moving of paper.
(f) Further time is saved by automatically removing the source text after the corresponding target text has been inserted, without the need for the user to remove such text manually, using a mouse or keys on a keyboard.
(g) Further time is saved by finding the next unit of text to be translated.
(h) Further time is saved by ignoring paragraphs that do not require translation, that is, paragraphs that contain only, among other things, numbers, fields, or graphics.
(i) Further time is saved by ensuring that the inserted text has the same paragraph-level formatting as the source text.
(j) The highlighting of the source text, when the source text is all the same color, immediately draws the user's attention to the next unit of text to be translated.
(k) The highlighting of the target text constantly draws the user's attention to the point where text is to be inserted.
(l) The moving of the unit of source text to be translated to the top of the display allows the user to always focus on the same place.
(m) The statistical reporting process aids in preventing the user from skipping text by comparing the source and target texts and reporting on possible anomalies encountered, such as a different number of sentences in the source and target texts, which may indicate that text in the source does not appear in the target. Many other checks and comparisons could be made.
(o) The plurality of processes implementing the advantages listed takes place at machine speed. The actual insertion of text occurs at human speed, possibly augmented by other features or processes.
(p) The process may be stopped and re-started or the process may be interrupted without change in the performance of the process.

There are several possibilities of how the process is executed, among them assigning the task of executing the process to one or more keys on a keyboard input device when text is entered using the keyboard, choosing the process from a menu of processes displayed on the video output device of the computer, assigning the task of executing the process to a voice command, or assigning the task of executing the process to a representative icon that would appear on said video output device.

Operation of the process is the same in all instances. It does not depend on document contents, position in the document, or other variables.

Accordingly, the process of the present invention can be used to insert target text immediately following source text that requires translation, to remove the source text once the user has completed insertion of the target text, and to then find and highlight the next unit of source text to be translated. The process moves progressively through the document identifying text that requires translation until the end of the document is reached. The process allows the user to work on-screen without having to move papers, find the current paragraph, find the next paragraph, or manually move through a document. Text for translation is presented methodically at the same place on the video output device.

Figure 19:
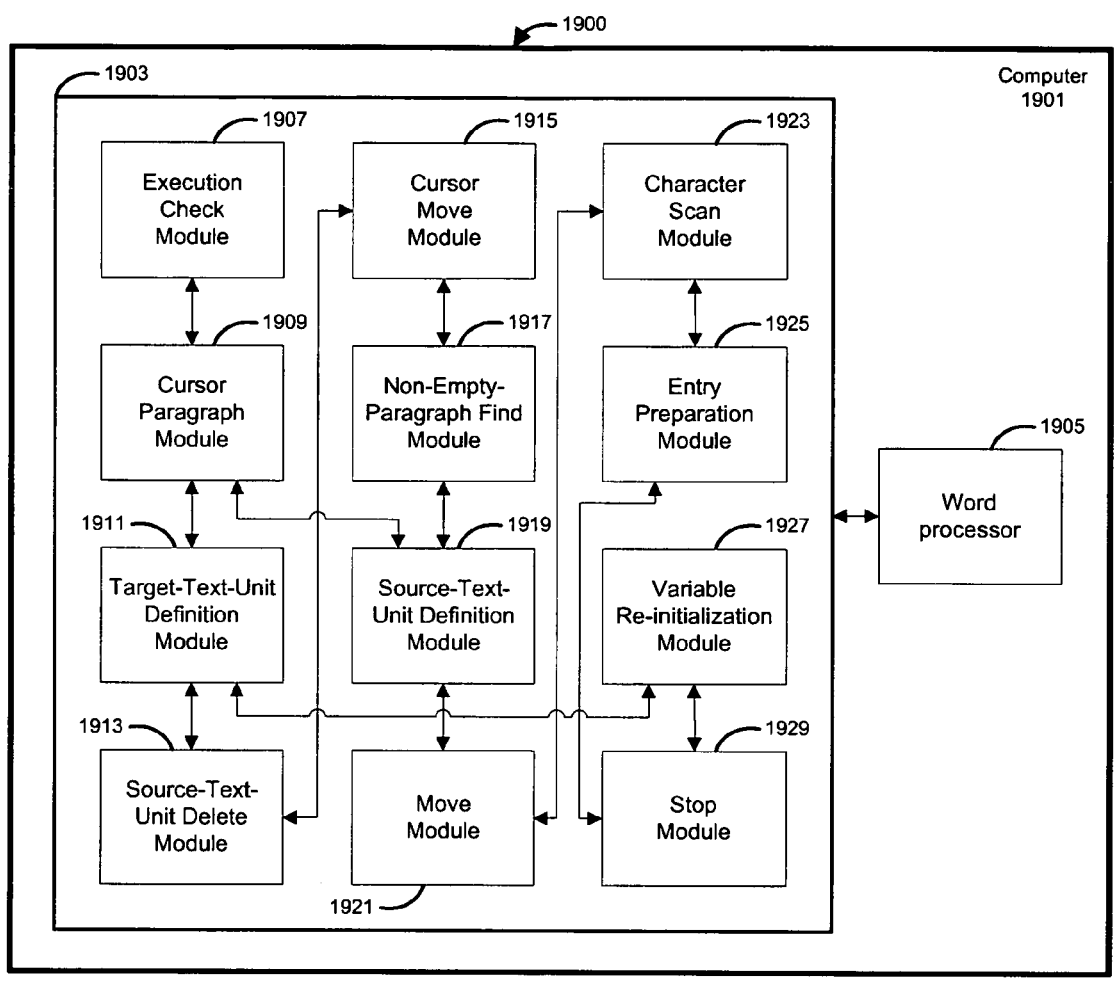
FIG. 19 illustrates an embodiment of a system in which the present invention may be used.

FIG. 19 illustrates an embodiment of a system 1900 in which the present invention may be used. The system 19 may be implemented on a computer 1901 such as, for example, a personal computer that has a translation tool 1903 in communication with a word processor 1905 such as, for example, the Microsoft Word word processor. The translation tool 1903 implements the tasks process described hereinabove using, for example, software code written in, for example, Visual Basic. The translation tool may be stored on a computer-readable medium resident on or separate from the computer 1901. The translation tool 1903 includes an execution check module 1907 that checks whether the current execution of the process is the first execution as described hereinabove in conjunction with FIG. 7.

A cursor paragraph module 1909 determines the number of the paragraph in which the cursor is located as described hereinabove in conjunction with FIG. 8. A target-text unit definition module 1911 defines the unit of target text as described hereinabove in conjunction with FIG. 9. A source-text unit delete module 1913 deletes the source text when translated as described hereinabove in conjunction with FIG. 10. A cursor move module 1915 moves the cursor to the end of the target text as described hereinabove in conjunction with FIG. 11.

A non-empty paragraph find module 1917 finds the next non-empty paragraph of source text as described hereinabove in conjunction with FIG. 12. A source-text-unit definition module 1919 defines the unit of source text as described hereinabove in conjunction with FIG. 13. A move module 1921 moves the defined unit of source text to the top of the active window as described hereinabove in conjunction with FIG. 14. A character scan module 1923 scans each character of the unit of defined source text and searches for control and similar characters as described hereinabove in conjunction with FIG. 15.

An entry preparation module 1925 prepares for entry of the target text as described hereinabove in conjunction with FIG. 16. A variable re-initialization module 1927 re-initializes the static variables used by the various modules of the tool 1903 as described hereinabove in conjunction with FIG. 17. A stop module 1929 stops execution of the process performed by the tool 1903 and returns control to the user as described hereinabove in conjunction with FIG. 18.

Although the description above contains may specificities, these should not be construed as limiting the scope of the invention but as merely providing illustrations of some of the embodiments of the invention. For example, the process can run on other hardware, it can be implemented in other software, it can run on a local or remote server for multiple simultaneous use, the colors for highlighting and differentiating source and target text can be changed or not used, the unit of source text could be made larger or smaller depending on needs, the statistical comparisons between source and target text can be augmented or scaled back depending on user needs or language pair, the source text could be left in the document, followed by the target text, for proofreading purposes, to be removed later, or to allow the insertion of more than one target-text language, with a method for displaying a given target language or not.

Thus, the scope of the invention should be determined by the appended claims and their legal equivalents, rather than by the examples given.

I claim:

1. A computer-assisted method of assisting a human language translator, comprising:
   highlighting a first unit of source text to be translated into a target language based upon a first value of a source-unit start variable and a first value of a source-unit end variable;
   allowing insertion of translated text following the highlighted first unit of source text, wherein the inserted translated text is manually translated into the target language by the human language translator from the highlighted first unit of source text;
   performing a comparative statistical analysis between the highlighted first unit of source text and the inserted translated text; and
   removing the highlighted first unit of source text after insertion of the translated text.

2. The method of claim 1, further comprising:
   determining if a second unit of source text is available for translation; and
   highlighting the second unit of source text based upon a second value of the source-unit start variable and a second value of the source-unit end variable when the second unit of source text is available for translation.

3. The method of claim 1, further comprising determining if the execution of the method is a first iteration of the method.

4. The method of claim 1, further comprising defining the first unit of source text prior to highlighting the first unit of source text.

5. The method of claim 1, further comprising executing the method for each paragraph of source text in a document.

6. An apparatus for assisting a human language translator, comprising:
   means for highlighting a first unit of source text to be translated into a target language based upon a first value of a source-unit start variable and a first value of a source-unit end variable;
   means for allowing insertion of translated text following the high-lighted first unit of source text, wherein the inserted translated text is manually translated into the target language by the human language translator from the highlighted first unit of source text;
   means for performing a comparative statistical analysis between the highlighted first unit of source text and the inserted translated text; and
   means for removing the highlighted first unit of source text after insertion of the translated text.

7. The apparatus of claim 6, further comprising:
   means for determining if a second unit of source text is available for translation; and
   means for highlighting the second unit of source text based upon a second value of the source-unit start variable and a second value of the source-unit end variable when the second unit of source text is available for translation.

8. A computer-readable medium having stored thereon a set of instructions which, when executed by a processor, cause the processor to:
   highlight a first unit of source text to be translated into a target language based upon a first value of a source-unit start variable and a first value of a source-unit end variable;
   allow for insertion of translated text following the highlighted first unit of source text, wherein the inserted translated text is manually translated into the target language by a human language translator from the highlighted first unit of source text;
   perform a comparative statistical analysis between the highlighted first unit of source text and the inserted translated text; and
   remove the highlighted first unit of source text after insertion of the translated text.

9. The medium of claim 8 having stored thereon further instructions which, when executed by the processor, cause the processor to:
   determine if a second unit of source text is available for translation; and
   highlight the second unit of source text based upon a second value of the source-unit start variable and a second value of the source-unit end variable when the second unit of source text is available for translation.

10. An apparatus for assisting a human language translator, comprising:
    a source text unit definition module for defining a unit of source text to be translated into a target language based upon a value of a source-unit start variable and a value of a source-unit end variable;
    a target text unit definition module for defining a unit of target text and for performing a comparative statistical analysis between the defined unit of source text and the defined unit of target text, wherein the defined unit of target text is defined at least in part based upon a translated text that is manually translated into the target language by the human language translator from the defined unit of source text;
    an entry preparation module for preparing for an entry of the unit of target text by the human language translator; and
    a source text unit delete module for deleting the unit of source text.

11. The apparatus of claim 10, further comprising an execution check module.

12. The apparatus of claim 10, further comprising a cursor paragraph module.

13. The apparatus of claim 10, further comprising a cursor move module.

14. The apparatus of claim 10, further comprising a non-empty paragraph find module.

15. The apparatus of claim 10, further comprising a move module.

16. The apparatus of claim 10, further comprising a character scan module.

17. The apparatus of claim 10, further comprising a variable reinitialization module.

18. The apparatus of claim 10, further comprising a stop module.

19. A translation system, comprising:

a word processor; and a translation tool in communication with the word processor, the translation tool comprising:

a source text unit definition module for defining a unit of source text to be translated into a target language based upon a value of a source-unit start variable and a value of a source-unit end variable;

a target text unit definition module for defining a unit of target text and for performing a comparative statistical analysis between the defined unit of source text and the defined unit of target text, wherein the defined unit of target text is defined at least in part based upon a translated text that is manually translated into the target language by the human language translator from the defined unit of source text;

an entry preparation module for preparing for an entry of the unit of target text by the human language translator; and a source text unit delete module for deleting the unit of source text.

* * * * *